(12) United States Patent
Guo et al.

(10) Patent No.: US 8,630,975 B1
(45) Date of Patent: Jan. 14, 2014

(54) KNOWLEDGE DISCOVERY FROM CITATION NETWORKS

(75) Inventors: Zhen Guo, Warrington, PA (US); Mark Zhang, Vernon, CT (US)

(73) Assignee: The Research Foundation for The State University of New York, Binghamton, NY (US)

( * ) Notice: Subject to any disclaimer, the term of this patent is extended or adjusted under 35 U.S.C. 154(b) by 66 days.

(21) Appl. No.: 13/310,098

(22) Filed: Dec. 2, 2011

Related U.S. Application Data

(60) Provisional application No. 61/420,059, filed on Dec. 6, 2010.

(51) Int. Cl.
*G06F 7/00* (2006.01)
*G06F 17/30* (2006.01)

(52) U.S. Cl.
USPC ........... 707/608; 707/724; 707/726; 707/738; 707/749

(58) Field of Classification Search
USPC ........................................................ 707/608
See application file for complete search history.

(56) References Cited

U.S. PATENT DOCUMENTS

| | | | |
|---|---|---|---|
| 2003/0182631 A1* | 9/2003 | Tsochantaridis et al. | 715/531 |
| 2007/0118498 A1* | 5/2007 | Song et al. | 707/1 |
| 2008/0208840 A1* | 8/2008 | Zhang et al. | 707/5 |
| 2010/0161611 A1* | 6/2010 | Guo et al. | 707/738 |
| 2011/0040764 A1* | 2/2011 | Duchon et al. | 707/738 |
| 2011/0112994 A1* | 5/2011 | Goto et al. | 706/12 |
| 2011/0302162 A1* | 12/2011 | Xiao et al. | 707/724 |
| 2012/0095952 A1* | 4/2012 | Archambeau et al. | 706/52 |
| 2012/0166179 A1* | 6/2012 | Tirumalachetty et al. | 704/9 |

OTHER PUBLICATIONS

Zhen Guo, "Knowledge Discovery From Citation Networks", 2009.*

* cited by examiner

*Primary Examiner* — Binh V Ho
(74) *Attorney, Agent, or Firm* — Steven M. Hoffberg; Ostrolenk Faber LLP

(57) ABSTRACT

In a corpus of scientific articles such as a digital library, documents are connected by citations and one document plays two different roles in the corpus: document itself and a citation of other documents. A Bernoulli Process Topic (BPT) model is provided which models the corpus at two levels: document level and citation level. In the BPT model, each document has two different representations in the latent topic space associated with its roles. Moreover, the multi-level hierarchical structure of the citation network is captured by a generative process involving a Bernoulli process. The distribution parameters of the BPT model are estimated by a variational approximation approach.

22 Claims, 8 Drawing Sheets

BPT model using the plate notation.

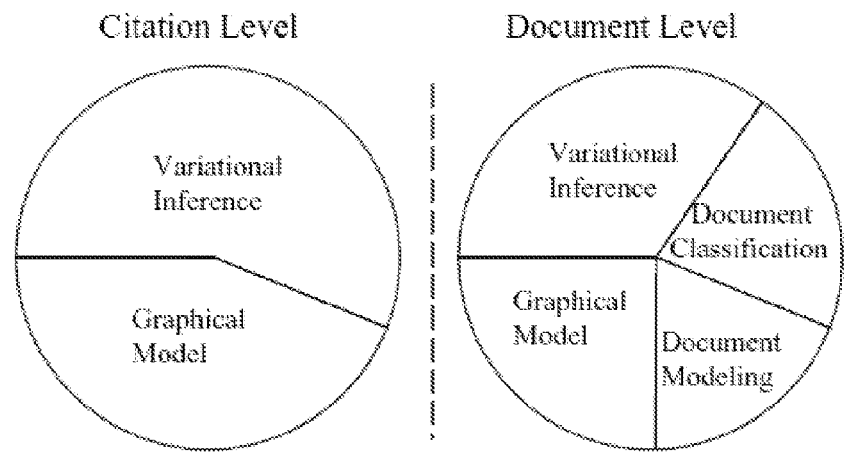
Figure 1. An illustration of the different topic distributions of the LDA paper at the document level and citation level.
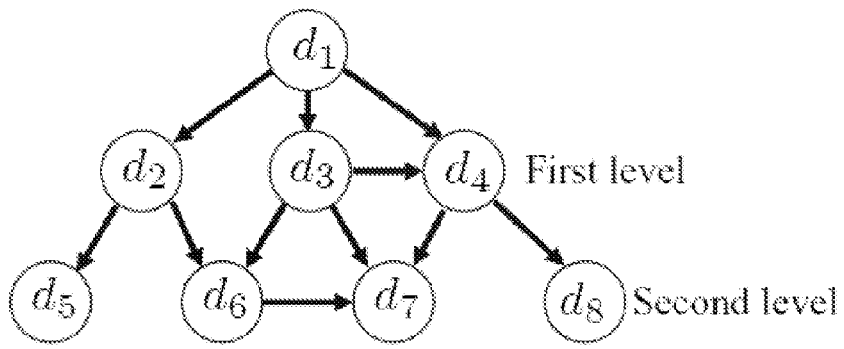
Figure 2. An illustration of the multi-level hierarchial structure of a citation network. Circles represent the papers and arrows represent the citation relationships.

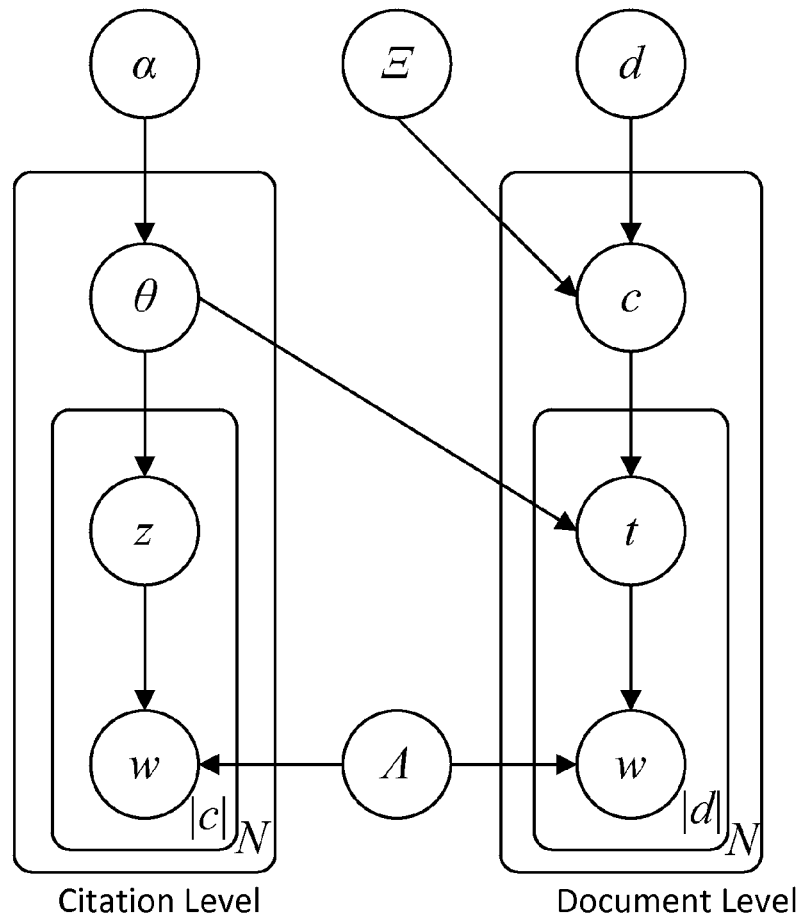
Figure 3. BPT model using the plate notation.
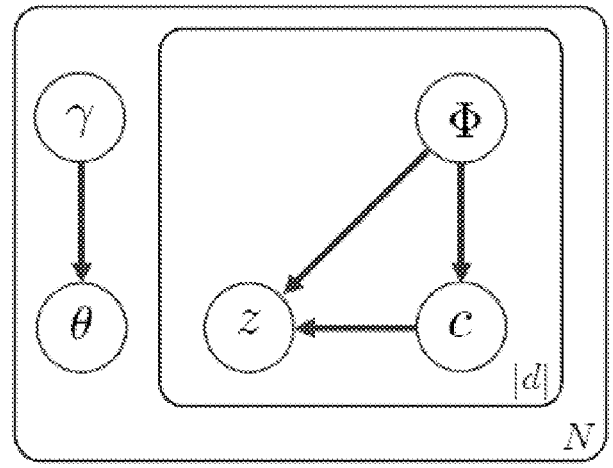
Figure 4. Graphical model representation of the variation distribution.

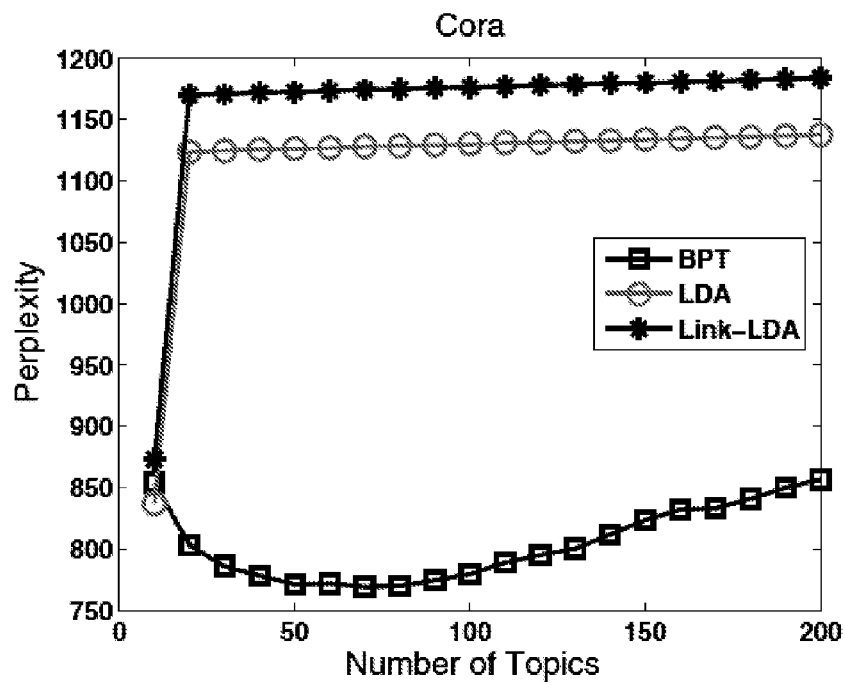
Figure. 5A. Perplexity comparison on the dataset. (Lower is better)
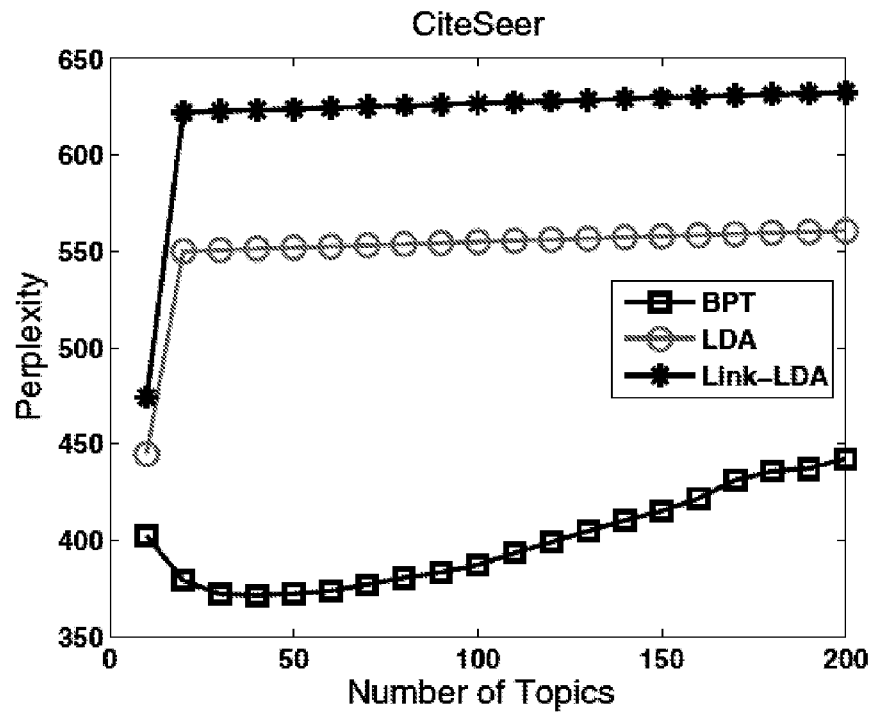
Figure 5B. Perplexity comparisons on the CiteSeer dataset. (Lower is better)

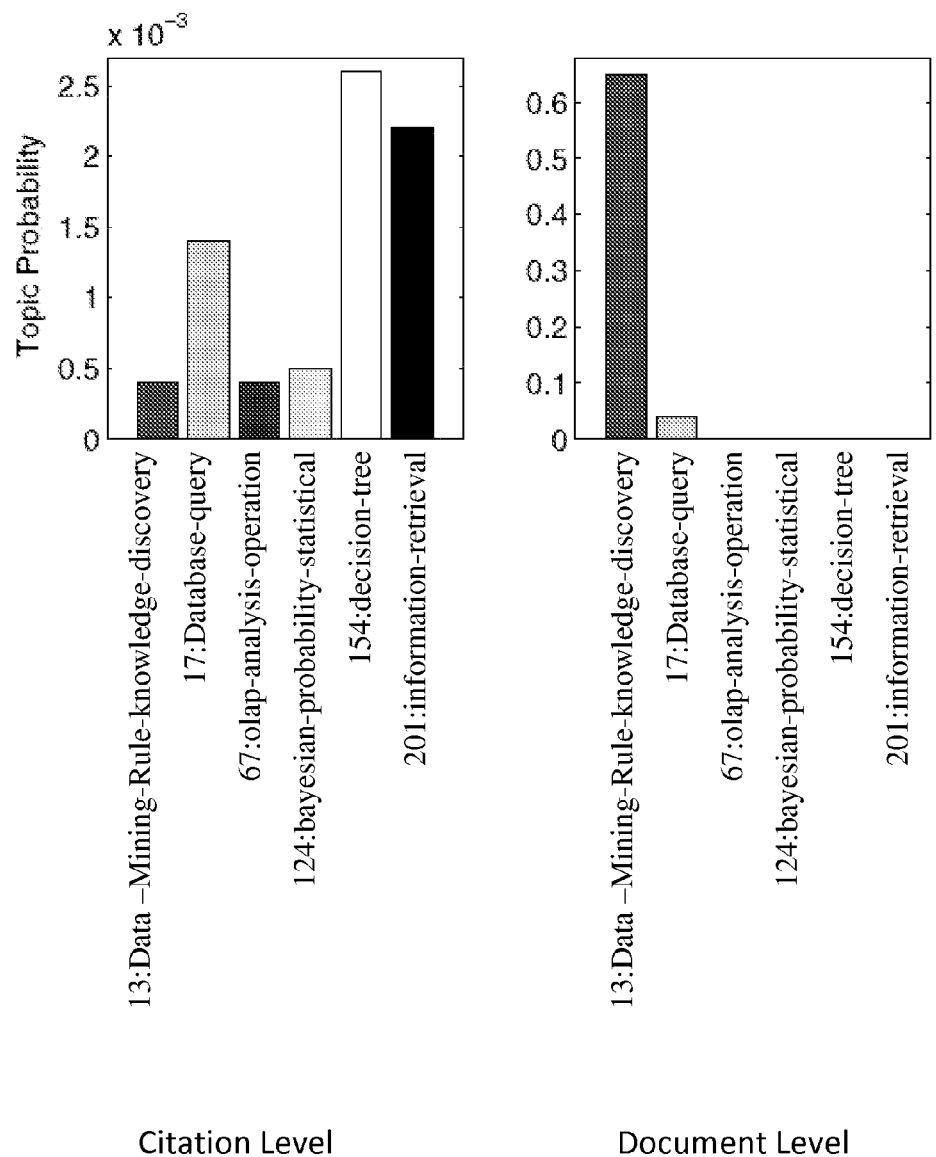
Figure 6. Topic distributions of the paper "Intelligent Query Answering by Knowledge Discovery Techniques".

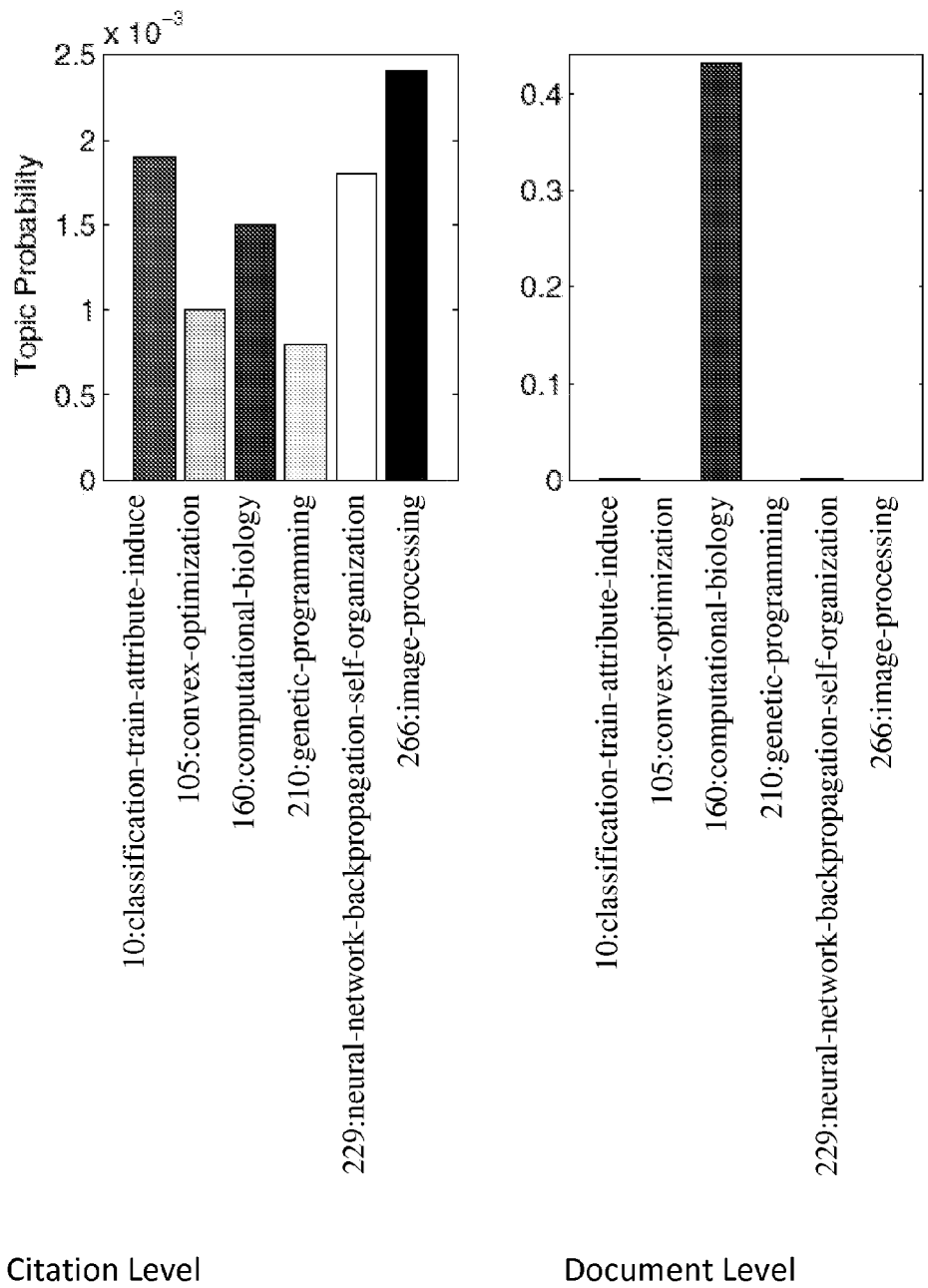
Figure 7. Topic distributions of the paper "The Megaprior Heuristic for Discovering Protein Sequence Patterns".

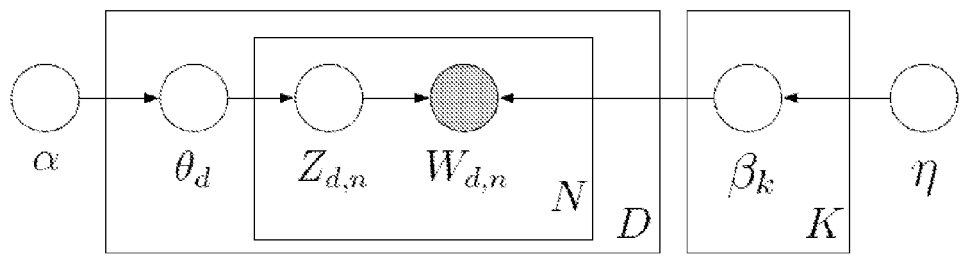

Figure 8. A graphical model representation of the latent Dirichlet allocation (LDA). Nodes denote random variables; edges denote dependence between random variables. Shaded nodes denote observed random variables; unshaded nodes denote hidden random variables. The rectangular boxes are "plate notation," which denote replication.

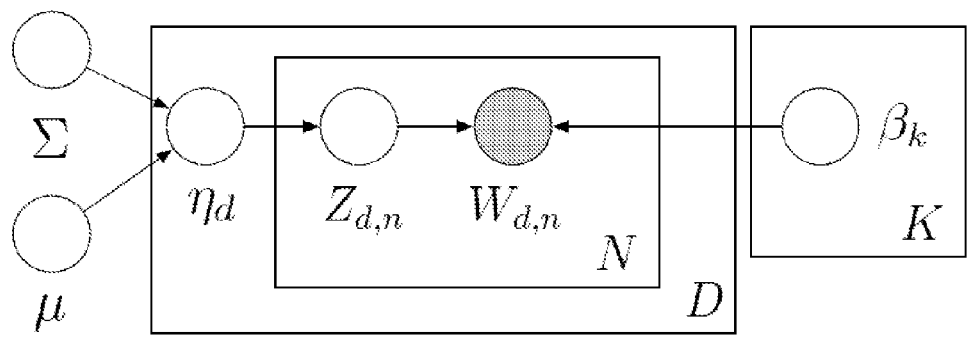

Figure 9. The graphical model for the correlated topic model.

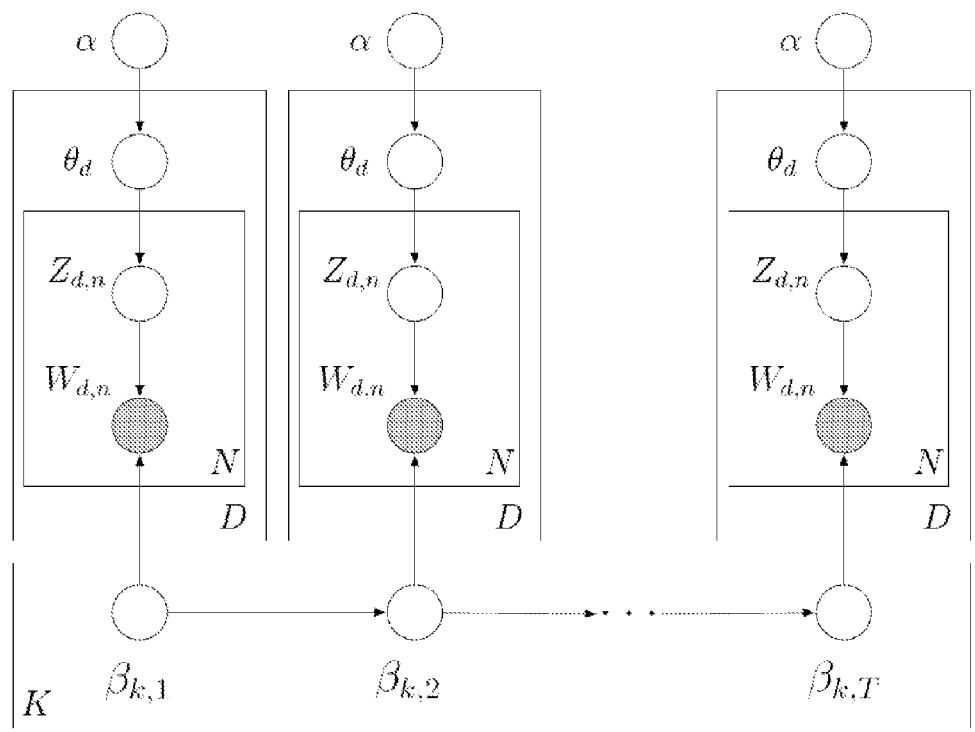
Figure 10. A graphical model representation of a dynamic topic model (for three time slices). Each topic's parameters t,k evolve over time.

KNOWLEDGE DISCOVERY FROM CITATION NETWORKS

CROSS REFERENCE TO RELATED APPLICATION

The present application claims benefit of priority from U.S. Provisional Patent Application 61/420,059, filed Dec. 6, 2010, the entirety of which is expressly incorporated herein by reference.

GOVERNMENT RIGHTS CLAUSE

This invention was made with government support under IIS-0535162, IIS-0812114 awarded by the National Science Foundation. The government has certain rights in the invention.

BACKGROUND OF THE INVENTION

Unsupervised learning from documents is a fundamental problem in machine learning, which aims at modeling the documents and providing a meaningful description of the documents while preserving the basic statistical information about the corpus. Many learning tasks, such as organizing, clustering, classifying, or searching a collection of the documents, fall into this category. This problem becomes even more important with the existing huge repositories of text data, especially with the rapid development of Internet and digital databases, and thus receives an increasing attention recently.

There has been comprehensive research on the unsupervised learning from a corpus and the latent topic models play a central role among the existing methods. The topic models extract the latent topics from the corpus and therefore represent the documents in the new latent semantic space. This new latent semantic space bridges the gap between the documents and words and thus enables the efficient processing of the corpus such as browsing, clustering, and visualization.

One of the learning tasks which play central roles in the data mining field is to understand the content of a corpus such that one can efficiently store, organize, and visualize the documents. Moreover, it is essential in developing the human-machine interface in an information processing system to improve user experiences. This problem has received more and more attentions recently since huge repositories of documents are made available by the development of the Internet and digital databases and analyzing such large-scale corpora is a challenging research area. Among the numerous approaches on the knowledge discovery from documents, the latent topic models play an important role. The topic models extract latent topics from the corpus and the documents have new representations in the new latent semantic space. This new latent semantic space bridges the gap between the documents and the words and thus enables efficient processing of the corpus such as browsing, clustering, and visualization. Probabilistic Latent Semantic Indexing (PLSI) [T. Hofmann, "Probabilistic latent semantic indexing," in *SIGIR*, 1999, pp. 50-57.] and Latent Dirichlet Allocation (LDA) [D. M. Blei, A. Y. Ng, and M. I. Jordan, "Latent dirichlet allocation," in *Journal of Machine Learning Research*, 2003, pp. 993-1022.] are two well-known topic models.

PLSI (Hofmann 1999) and LDA (Blei, Ng, and Jordan 2003) are two well known topic models toward document modeling by treating each document as a mixture of a set of topics. In these and other existing probabilistic models, a basic assumption underpinning the generative process is that the documents are independent of each other. More specifically, they assume that the topic distributions of the documents are independent of each other. However, this assumption does not hold true in practice and the documents in a corpus are actually related to each other in certain ways; for example, research papers are related to each other by citations. The existing approaches treat the citations as the additional features similar to the content. For example, Cohn et al. (2000) applies the PLSI model to a new feature space which contains both content and citations. The LDA model is also exploited in a similar way (Erosheva, Fienberg, and Lafferty 2004). As another example, Zhu et al. (2007) combine the content and citations to form an objective function for optimization.

A basic assumption underpinning the PLSI and LDA models as well as other topic models is that the documents are independent of each other. However, documents in most of corpora are related to each other in many ways instead of being isolated, which suggests that such information should be considered in analyzing the corpora. For example, research papers are related to each other by citations in the digital libraries. One approach is to treat the citations as the additional features in a similar way to the content features and apply the existing approaches to the new feature space, where Cohn et al. [D. A. Cohn and T. Hofmann, "The missing link—a probabilistic model of document content and hypertext connectivity," in *NIPS*, 2000, pp. 430-436] used PLSI model and Erosheva et al. [E. Erosheva, S. Fienberg, and J. Lafferty, "Mixed membership models of scientific publications," in *Proceedings of the National Academy of Sciences*, 101 Suppl 1:5220-7 (2004)] applied LDA model. Zhu et al. [S. Zhu, K. Yu, Y. Chi, and Y. Gong, "Combining content and link for classification using matrix factorization," in *SIGIR*, 2007, pp. 487-494] formulated a loss function in the new feature space for optimization. The above studies, however, fail to capture two important properties of the citation network. First, one document plays two different roles in the corpus: document itself and a citation of other documents. The topic distributions of these two roles are different and are related in a particular way. It should be beneficial to model the corpus at a finer level by differentiating these two roles for each document. For example, in the well-known LDA paper, Blei et al. [D. M. Blei, A. Y. Ng, and M. I. Jordan, "Latent dirichlet allocation," in *Journal of Machine Learning Research*, 2003, pp. 993-1022] proposed a graphical model for document modeling and adopted the variational inference approach for parameter estimation. When the LDA paper serves as the citation role, one might be more interested in the graphical model and variational inference approach than other content covered in the LDA paper. This is the case, especially when one is interested in the applications of the LDA model in other contexts, such as the document clustering task. Therefore, the topic distributions of the LDA paper at the two levels (document level and citation level) are different, as illustrated in FIG. 1. The topic models which simply treat the citations as the features in a peer-level to the content fail to differentiate these two levels.

The second property of the citation network that is ignored by the above studies is the multi-level hierarchical structure, which implies that the relations represented by the citations are transitive. A small citation network is illustrated in FIG. 2, where the first level citations of document $d_1$ are those papers directly cited by $d_1$ and the second level citations of $d_1$ are those papers cited by the papers in the reference list of $d_1$. Although the second level citations are not directly cited by $d_1$, they are also likely to influence $d_1$ to a lesser degree than the first level citations. For example, $d_5$ is not directly cited by $d_1$; however, $d_1$ is probably influenced by $d_5$ indirectly through $d_2$. A topic model which fails to capture such multi-level structure is flawed.

The Latent Dirichlet allocation (LDA) (see, Blei, David and Lafferty, John, "Topic Models", In A. Srivastava and M. Sahami, editors, Text Mining: Theory and Applications. Taylor and Francis, 2009, expressly incorporated by reference, and liberally quoted below), has is a basis for many other topic models. LDA is based on latent semantic indexing (LSI) (Deerwester et al., 1990) and probabilistic LSI (Hofmann, 1999). See also, Steyvers and Griffiths (2006). LDA can be developed from the principles of generative probabilistic models. LDA models documents as arising from multiple topics, where a topic is defined to be a distribution over a fixed vocabulary of terms. Specifically, we assume that K topics are associated with a collection, and that each document exhibits these topics with different proportions. Documents in a corpus tend to be heterogeneous, combining a subset of main ideas or themes from the collection as a whole. These topics are not typically known in advance, but may be learned from the data.

More formally, LDA provides a hidden variable model of documents. Hidden variable models are structured distributions in which observed data interact with hidden random variables. With a hidden variable model, a hidden structure is posited within in the observed data, which is inferred using posterior probabilistic inference. Hidden variable models are prevalent in machine learning; examples include hidden Markov models (Rabiner, 1989), Kalman filters (Kalman, 1960), phylogenetic tree models (Mau et al., 1999), and mixture models (McLachlan and Peel, 2000).

In LDA, the observed data are the words of each document and the hidden variables represent the latent topical structure, i.e., the topics themselves and how each document exhibits them. Given a collection, the posterior distribution of the hidden variables given the observed documents determines a hidden topical decomposition of the collection. Applications of topic modeling use posterior estimates of these hidden variables to perform tasks such as information retrieval and document browsing.

The relation between the observed documents and the hidden topic structure is extracted with a probabilistic generative process associated with LDA, the imaginary random process that is assumed to have produced the observed data. That is, LDA assumes that the document is randomly generated based on the hidden topic structure.

Let K be a specified number of topics, V the size of the vocabulary, $\vec{\alpha}$ a positive K-vector, and $\eta$ a scalar. $\text{Dir}_V(\vec{\alpha})$ denotes a V-dimensional Dirichlet with vector parameter $\vec{\alpha}$ and $\text{Dir}_K(\eta)$ denote a K dimensional symmetric Dirichlet with scalar parameter $\eta$. For each topic, we draw a distribution over words $\vec{\beta}_k \sim \text{Dir}_V(\vec{\alpha})$. For each document, we draw a vector of topic proportions $\vec{\theta}_d \sim \text{Dir}_V(\vec{\alpha})$. For each word, we draw a topic assignment $Z_{d,n} \sim \text{Mult}(\vec{\theta}_d)$, $Z_{d,n} \in \{1, \ldots, K\}$, and draw a word $W_{d,n} \sim \text{Mult}(\vec{\beta}_{z_{d,n}})$, $W_{d,n} \in \{1, \ldots, V\}$. This process is illustrated as a directed graphical model in FIG. 9.

The hidden topical structure of a collection is represented in the hidden random variables: the topics $\vec{\beta}_{1:K}$, the per-document topic proportions $\vec{\theta}_{1:D}$, and the per-word topic assignments $z_{1:D,1:N}$. With these variables, LDA is a type of mixed-membership model (Erosheva et al., 2004). These are distinguished from classical mixture models (McLachlan and Peel, 2000; Nigam et al., 2000), where each document is limited to exhibit one topic.

This additional structure is important because documents often exhibit multiple topics; LDA can model this heterogeneity while classical mixtures cannot. Advantages of LDA over classical mixtures has been quantified by measuring document generalization (Blei et al., 2003). LDA makes central use of the Dirichlet distribution, the exponential family distribution over the simplex of positive vectors that sum to one. The Dirichlet has density:

$$p(\theta | \vec{\alpha}) = \frac{\Gamma\left(\sum_i \alpha_i\right)}{\prod_i \Gamma(\alpha_i)} \prod_i \theta_i^{\alpha_i - 1}.$$

The parameter $\vec{\alpha}$ is a positive K-vector, and $\Gamma$ denotes the Gamma function, which can be thought of as a real-valued extension of the factorial function. A symmetric Dirichlet is a Dirichlet where each component of the parameter is equal to the same value. The Dirichlet is used as a distribution over discrete distributions; each component in the random vector is the probability of drawing the item associated with that component.

LDA contains two Dirichlet random variables: the topic proportions $\vec{\theta}$ are distributions over topic indices $\{1, \ldots, K\}$; the topics $\vec{\beta}$ are distributions over the vocabulary.

Exploring a corpus with the posterior distribution. LDA provides a joint distribution over the observed and hidden random variables. The hidden topic decomposition of a particular corpus arises from the corresponding posterior distribution of the hidden variables given the D observed documents $\vec{w}_{1:D}$, $$p(\vec{\theta}_{1:D}, \vec{z}_{1:D, 1:N}, \vec{\beta}_{1:K} | \vec{w}_{1:D, 1:N}, \alpha, \eta) =$$

$$\frac{p(\vec{\theta}_{1:D}, \vec{z}_{1:D, 1:N}, \vec{\beta}_{1:K} | \vec{w}_{1:D, 1:N}, \alpha, \eta)}{\int_{\vec{\beta}_{1:K}} \int_{\vec{\theta}_{1:D}} \sum_{\vec{z}} p(\vec{\theta}_{1:D}, \vec{z}_{1:D}, \vec{\beta}_{1:K} | \vec{w}_{1:D}, \alpha, \eta)}$$

Loosely, this posterior can be thought of the "reversal" of the generative process described above. Given the observed corpus, the posterior is a distribution of the hidden variables which generated it.

Computing this distribution is generally considered intractable because of the integral in the denominator, Blei et al. (2003). The posterior distribution gives a decomposition of the corpus that can be used to better understand and organize its contents. The quantities needed for exploring a corpus are the posterior expectations of the hidden variables. These are the topic probability of a term $\hat{\beta}_{k,v} = E[\beta_{k,v} | w_{1:D, 1:N}]$ the topic proportions of a document $\hat{\theta}_{d,k} = E[\theta_{d,k} | w_{1:D, 1:N}]$, and the topic assignment of a word $\hat{z}_{d,n,k} = E[Z_{d,n} = k | w_{1:D, 1:N}]$. Note that each of these quantities is conditioned on the observed corpus.

Exploring a corpus through a topic model typically begins with visualizing the posterior topics through their per-topic term probabilities $\hat{\beta}$. The simplest way to visualize a topic is to order the terms by their probability. However, we prefer the following score, $$\text{term-score}_{k,v} = \hat{\beta}_{k,v} \log\left(\frac{\hat{\beta}_{k,v}}{\left(\prod_{j=1}^{K} \hat{\beta}_{k,v}\right)^{\frac{1}{K}}}\right).$$

This is inspired by the popular TFIDF term score of vocabulary terms used in information retrieval Baeza-Yates and Ribeiro-Neto (1999). The first expression is akin to the term frequency; the second expression is akin to the document frequency, down-weighting terms that have high probability under all the topics. Other methods of determining the difference between a topic and others can be found in (Tang and MacLennan, 2005).

The posterior topic proportions $\hat{\theta}_{d,k}$ and posterior topic assignments to $\hat{z}_{d,n,k}$ to visualize the underlying topic decomposition of a document. Plotting the posterior topic proportions gives a sense of which topics the document is "about." These vectors can also be used to group articles that exhibit certain topics with high proportions. Note that, in contrast to traditional clustering models (Fraley and Raftery, 2002), articles contain multiple topics and thus can belong to multiple groups. Finally, examining the most likely topic assigned to each word gives a sense of how the topics are divided up within the document.

The posterior topic proportions can be used to define a topic-based similarity measure between documents. These vectors provide a low dimensional simplicial representation of each document, reducing their representation from the (V−1)-simplex to the (K−1)-simplex. One can use the Hellinger distance between documents as a similarity measure, $$\text{document-similarity}_{d,f} = \sum_{k=1}^{K} \left(\sqrt{\hat{\theta}_{d,k}} - \sqrt{\hat{\theta}_{f,k}}\right)^2.$$

The central computational problem for topic modeling with LDA is approximating the posterior. This distribution is the key to using LDA for both quantitative tasks, such as prediction and document generalization, and the qualitative exploratory tasks that we discuss here. Several approximation techniques have been developed for LDA, including mean field variational inference (Blei et al., 2003), collapsed variational inference (Teh et al., 2006), expectation propagation (Minka and Lafferty, 2002), and Gibbs sampling (Steyvers and Griffiths, 2006). Each has advantages and disadvantages: choosing an approximate inference algorithm amounts to trading off speed, complexity, accuracy, and conceptual simplicity.

The basic idea behind variational inference is to approximate an intractable posterior distribution over hidden variables, with a simpler distribution containing free variational parameters. These parameters are then fit so that the approximation is close to the true posterior.

The LDA posterior is intractable to compute exactly because the hidden variables (i.e., the components of the hidden topic structure) are dependent when conditioned on data. Specifically, this dependence yields difficulty in computing the denominator of the posterior distribution equation, because one must sum over all configurations of the interdependent N topic assignment variables $z_{1:N}$.

In contrast to the true posterior, the mean field variational distribution for LDA is one where the variables are independent of each other, with and each governed by a different variational parameter:

$$p(\vec{\theta}_{1:D}, z_{1:D,1:N}, \vec{\beta}_{1:K}) = \prod_{k=1}^{K} q(\vec{\beta}_k \mid \vec{\lambda}_k) \prod_{d=1}^{D} \left(q(\vec{\theta}_{dd} \mid \vec{\gamma}_d) \prod_{n=1}^{N} q(z_{d,n} \mid \vec{\phi}_{d,n})\right)$$

Each hidden variable is described by a distribution over its type: the topics $\vec{\beta}_{1:K}$ are each described by a V-Dirichlet distribution $\vec{\lambda}_k$; the topic proportions $\vec{\theta}_{1:D}$ are each described by a K-Dirichlet distribution $\vec{\lambda}_d$; and the topic assignment $z_{d,n}$ is described by a K-multinomial distribution $\vec{\phi}_{d,n}$. In the variational distribution these variables are independent; in the true posterior they are coupled through the observed documents. The variational parameters are fit to minimize the Kullback-Leibler (KL) to the true posterior:

$$\arg\min_{\vec{\gamma}_{1:D}, \vec{\lambda}_{1:K}, \vec{\phi}_{1:D,1:N}} KL(q(\vec{\theta}_{1:D, z_1:D,1:N}, \vec{\beta}_{1:K}) \| p(\vec{\theta}_{1:D,z_1:D,1:N}, \vec{\beta}_{1:K} \mid w_{1:D,1:N}))$$

The objective cannot be computed exactly, but it can be computed up to a constant that does not depend on the variational parameters. (In fact, this constant is the log likelihood of the data under the model.)

Specifically, the objective function is $$\mathcal{L} \sum_{k=1}^{K} E\left[\log p(\vec{\beta}_k \mid \eta)\right] + \sum_{d=1}^{D} E\left[\log p(\vec{\theta}_d \mid \vec{\alpha})\right] +$$

$$\sum_{d=1}^{D}\sum_{k=1}^{K} E\left[\log p(Z_{d,n} \mid \vec{\theta}_d)\right] + \sum_{d=1}^{D}\sum_{k=1}^{K} E\left[\log p(w_{d,n} \mid Z_{d,n}, \vec{\beta}_{1:K})\right] + H(q)$$

where H denotes the entropy and all expectations are taken with respect to the variational parameter distribution. See Blei et al. (2003) for details on how to compute this function. Optimization proceeds by coordinate ascent, iteratively optimizing each variational parameter to increase the objective. Mean field variational inference for LDA is discussed in detail in (Blei et al., 2003), and good introductions to variational methods include (Jordan et al., 1999) and (Wainwright and Jordan, 2005).

The true posterior Dirichlet variational parameter for a term given all of the topic assignments and words is a Dirichlet with parameters $\eta + n_{k,w}$, where $n_{k,w}$ denotes the number of times word w is assigned to topic k. (This follows from the conjugacy of the Dirichlet and multinomial. See (Gelman et al., 1995) for a good introduction to this concept.) The update of λ below is nearly this expression, but with $n_{k,w}$ replaced by its expectation under the variational distribution. The independence of the hidden variables in the variational distribution guarantees that such an expectation will not depend on the parameter being updated. The variational update for the topic proportions γ is analogous.

The variational update for the distribution of $z_{d,n}$ follows a similar formula. Consider the true posterior of $z_{d,n}$, given the other relevant hidden variables and observed word $w_{d,n}$, $$p(z_{d,n}=k \mid \vec{\theta}_d, w_{d,n}, \vec{\beta}_{1:K}) \propto \exp\{\log \theta_{d,k} + \log \beta_{k,w_{d,n}}\}$$

The update of φ is this distribution, with the term inside the exponent replaced by its expectation under the variational distribution. Note that under the variational Dirichlet distribution, $E[\log \beta_{k,w}] = \Psi(\lambda_{k,w}) - \Psi(\Sigma_v \lambda_{k,v})$, and $E[\log \theta_{d,k}]$ is similarly computed.

An iteration of mean field variational inference for LDA is provided as follows:

(1) For each topic k and term v:

$$\lambda_{k,v}^{(t+1)} = \eta = \sum_{d=1}^{D} \sum_{n=1}^{N} 1(w_{d,n} = v) \phi_{n,k}^{(t)}.$$

(2) For each document d:
(a) Update $\gamma_d$ $$\gamma_{d,k}^{(t+1)} = \alpha_k + \sum_{n=1}^{N} \phi_{d,n,k}^{(t)}$$

(b) For each word n, update $\vec{\phi}_{d,n}$:

$$\phi_{d,n,k}^{(t+1)} \propto \exp\left\{\Psi(\gamma_{d,k}^{(t+1)}) + \Psi(\lambda_{k,w_n}^{(t+1)}) - \Psi\left(\sum_{v=1}^{V} \lambda_{k,v}^{(t+1)}\right)\right\}$$

where $\Psi$ is the digamma function, the first derivative of the log $\Gamma$ function.

This algorithm is repeated until the objective function converges. Each update has a close relationship to the true posterior of each hidden random variable conditioned on the other hidden and observed random variables.

This general approach to mean-field variational methods—update each variational parameter with the parameter given by the expectation of the true posterior under the variational distribution—is applicable when the conditional distribution of each variable is in the exponential family. This has been described by several authors (Beal, 2003; Xing et al., 2003; Blei and Jordan, 2005) and is the backbone of the VIBES framework (Winn and Bishop, 2005). The quantities needed to explore and decompose the corpus are readily computed from the variational distribution.

The per-term topic probabilities are:

$$\hat{\beta}_{k,v} = \frac{\lambda_{k,v}}{\sum_{v'=1}^{V} \lambda_{k,v'}}.$$

The per topic proportions are:

$$\hat{\theta}_{d,k} = \frac{\gamma_{d,k}}{\sum_{k'=1}^{K} \gamma_{d,k'}}.$$

The per topic assignment expectation is: $\hat{z}_{d,n,k} = \phi_{d,n,k}$.

The computational bottleneck of the algorithm is typically computing the $\Psi$ function, which should be precomputed as much as possible.

Each of the correlated topic model and the dynamic topic model embellishes LDA to relax one of its implicit assumptions. In addition to describing topic models that are more powerful than LDA, our goal is give the reader an idea of the practice of topic modeling. Deciding on an appropriate model of a corpus depends both on what kind of structure is hidden in the data and what kind of structure the practitioner cares to examine. While LDA may be appropriate for learning a fixed set of topics, other applications of topic modeling may call for discovering the connections between topics or modeling topics as changing through time.

The correlated topic model addresses one limitation of LDA, which fails to directly model correlation between the occurrence of topics. In many text corpora, it is natural to expect that the occurrences of the underlying latent topics will be highly correlated. In LDA, this modeling limitation stems from the independence assumptions implicit in the Dirichlet distribution of the topic proportions. Specifically, under a Dirichlet, the components of the proportions vector are nearly independent, which leads to the strong assumption that the presence of one topic is not correlated with the presence of another. (We say "nearly independent" because the components exhibit slight negative correlation because of the constraint that they have to sum to one.)

In the correlated topic model (CTM), the topic proportions are modeled with an alternative, more flexible distribution that allows for covariance structure among the components (Blei and Lafferty, 2007). This gives a more realistic model of latent topic structure where the presence of one latent topic may be correlated with the presence of another. The CTM better fits the data, and provides a rich way of visualizing and exploring text collections.

The key to the CTM is the logistic normal distribution (Aitchison, 1982). The logistic normal is a distribution on the simplex that allows for a general pattern of variability between the components. It achieves this by mapping a multivariate random variable from Rd to the d-simplex. In particular, the logistic normal distribution takes a draw from a multivariate Gaussian, exponentiates it, and maps it to the simplex via normalization. The covariance of the Gaussian leads to correlations between components of the resulting simplicial random variable. The logistic normal was originally studied in the context of analyzing observed data such as the proportions of minerals in geological samples. In the CTM, it is used in a hierarchical model where it describes the hidden composition of topics associated with each document.

Let $\{\mu, \Sigma\}$ be a K-dimensional mean and covariance matrix, and let topics $\beta_{1:K}$ be K multinomials over a fixed word vocabulary, as above. The CTM assumes that an N-word document arises from the following generative process:

(1) Draw $\eta | \{\mu, \Sigma\} \sim n(\mu, \Sigma)$.
(2) For $n \in \{1, \ldots, N\}$
  a. Draw a topic assignment $Z_n | \eta$ from $\text{Mult}(f(\eta))$.
  b. Draw word $W_n | \{z_n, \beta_{1:K}\}$ from $\text{Mult}(\beta_{z_n})$ The function that maps the real-vector $\eta$ to the simplex is $$f(\eta_i) = \frac{\exp\{\eta_i\}}{\sum_j \exp\{\eta_j\}}$$

Note that this process is identical to the generative process of LDA except that the topic proportions are drawn from a logistic normal rather than a Dirichlet. The model is shown as a directed graphical model in FIG. 9.

The CTM is more expressive than LDA because the strong independence assumption imposed by the Dirichlet in LDA is not realistic when analyzing real document collections. Quantitative results illustrate that the CTM better fits held out data than LDA (Blei and Lafferty, 2007). Moreover, this higher order structure given by the covariance can be used as an exploratory tool for better understanding and navigating a large corpus. The added flexibility of the CTM comes at a computational cost. Mean field variational inference for the CTM is not as fast or straightforward as the algorithm described above for Analyzing an LDA. In particular, the update for the variational distribution of the topic proportions must be fit by gradient-based optimization. See (Blei and Lafferty, 2007) for details.

LDA and the CTM assume that words are exchangeable within each document, i.e., their order does not affect their probability under the model. This assumption is a simplification that it is consistent with the goal of identifying the semantic themes within each document. But LDA and the CTM further assume that documents are exchangeable within the corpus, and, for many corpora, this assumption is inappropriate. The topics of a document collection evolve over time. The evolution and dynamic changes of the underlying topics may be modeled. The dynamic topic model (DTM) captures the evolution of topics in a sequentially organized corpus of documents. In the DTM, the data is divided by time slice, e.g., by year. The documents of each slice are modeled with a K-component topic model, where the topics associated with slice t evolve from the topics associated with slice t−1.

The logistic normal distribution is also exploited, to capture uncertainty about the time-series topics. The sequences of simplicial random variables are modeled by chaining Gaussian distributions in a dynamic model and mapping the emitted values to the simplex. This is an extension of the logistic normal to time-series simplex data (West and Harrison, 1997).

For a K-component model with V terms, let $\vec{\pi}_{t,k}$ denote a multivariate Gaussian random variable for topic k in slice t. For each topic, we chain $\{\vec{\pi}_{1,k}, \ldots, \vec{\pi}_{T,k}\}$ in a state space model that evolves with Gaussian noise: $\vec{\pi}_{t,k} | \vec{\pi}_{t-1,k} \sim N(\vec{\pi}_{t-1,k}, \sigma^2 I)$.

When drawing words from these topics, the natural parameters are mapped back to the simplex with the function $f$. Note that the timeseries topics use a diagonal covariance matrix. Modeling the full V×V covariance matrix is a computational expense that is not necessary for this purpose.

By chaining each topic to its predecessor and successor, a collection of topic models is sequentially tied. The generative process for slice t of a sequential corpus is (1) Draw topics $\vec{\pi}_{t,k} | \vec{\pi}_{t-1,k} \sim N(\vec{\pi}_{t-1,k}, \sigma^2 I)$
(2) For each document:
  a. Draw $\theta_d \sim Dir(\vec{\alpha})$
  b. For each word:
    i. Draw $Z \sim Mult(\theta_d)$
    ii. Draw $W_{t,d,n} \sim Mult(f(\vec{\pi}_{t,z}))$.

This is illustrated as a graphical model in FIG. 10. Notice that each time slice is a separate LDA model, where the kth topic at slice t has smoothly evolved from the kth topic at slice t−1.

The posterior can be approximated over the topic decomposition with variational methods (see Blei and Lafferty (2006) for details). At the topic level, each topic is now a sequence of distributions over terms. Thus, for each topic and year, we can score the terms (termscore) and visualize the topic as a whole with its top words over time, providing a global sense of how the important words of a topic have changed through the span of the collection. For individual terms of interest, their score may be examined over time within each topic. The overall popularity of each topic is examined from year to year by computing the expected number of words that were assigned to it.

The document similarity metric (document-similarity) has interesting properties in the context of the DTM. The metric is defined in terms of the topic proportions for each document. For two documents in different years, these proportions refer to two different slices of the K topics, but the two sets of topics are linked together by the sequential model. Consequently, the metric provides a time corrected notion of document similarity.

SUMMARY OF THE INVENTION

According to an embodiment of the technology, a generative model is provided for modeling the documents linked by the citations, called the Bernoulli Process Topic ("BPT") model, which explicitly exploits the above two properties of the citation network. In this model, the content of each document is a mixture of two sources: (1) the content of the given document, and (2) the content of other documents related to the given document through the multi-level citation structure. This perspective actually reflects the process of writing a scientific article: the authors first learn the knowledge from the literature and then combine their own creative ideas with what they learnt from the literature to form the content of their article. Consequently, the literature from which they learnt knowledge forms the citations of their article. Furthermore, the multi-level structure of the citation network is captured by a Bernoulli process which generates the related documents, where the related documents are not necessarily directly cited by the given document. In addition, due to a Bayesian treatment of parameter estimation, BPT can generate a new corpus unavailable in the training stage. Comprehensive evaluations were conducted to investigate the performance of the BPT model. The experimental results on the document modeling task demonstrated that the BPT model achieves a significant improvement over state-of-the-art methods on the generalization performance. Moreover, the BPT model was applied to the well-known Cora corpus to discover the latent topics. The comparisons against state-of-the-art methods demonstrate the promising knowledge discovery capability of the BPT model. See, Zhen Guo, Zhongfei (Mark) Zhang, Shenghuo Zhu, Yun Chi, Yihong Gong, "Knowledge Discovery from Citation Networks", ICDM '09, Ninth IEEE International Conference on Data Mining, Miami Fla., pp. 800-805 (2009); Zhen Guo, Shenghuo Zhu, Zhongfei (Mark) Zhang, Yun Chi, Yihong Gong, "A Topic Model for Linked Documents and Update Rules for Its Estimation", Proceedings of the Twenty-Fourth AAAI Conference on Artificial Intelligence (AAAI-10), Atlanta Ga., pp. 463-468 (2010); US 2009/0094196; and US 2010/0161611; each of which is expressly incorporated herein by reference.

Bernoulli Process Topic (BPT) model is a generative probabilistic model of a corpus along with the citation information among the documents. Similar to the existing topic models, each document is represented as a mixture over latent topics. A key feature that distinguishes the BPT model from the existing topic models is that the relationships among the documents are modeled by a Bernoulli process such that the topic distribution of each document is a mixture of the distributions associated with the related documents.

Suppose that the corpus D consists of N documents in which M distinct words form the vocabulary set W. A document d is a sequence of $L_d$ words denoted by $w_d=(w_{d1}, w_{d2}, \ldots, w_{dL_d})$ where $L_d$ is the length of the document and $w_{di} \in W$ is the word in the i-th position of the document. In addition, each document d may have a set of citations $C_d$, so that the documents are linked together by these citations. Therefore, the corpus can be represented by a directed graph. Other types of relationships among the documents are also possible such as hyperlinks among the webpages and they also lead to a directed graph. Consequently, BPT model is applicable to the general scenario where the linked documents can be represented by a directed graph. For simplicity, we focus on the situation where citations among the documents are available. The extension to other scenarios is straightforward.

PLSI [T. Hofmann, "Probabilistic latent semantic indexing," in *SIGIR*, 1999, pp. 50-57.] is one topic model for document modeling which treats documents as mixtures of the topics and each topic as a multinomial distribution over the words. However, PLSI cannot generate new documents which are not available in the training stage. To address this limitation, Blei et al. [D. M. Blei, A. Y. Ng, and M. I. Jordan, "Latent dirichlet allocation," in *Journal of Machine Learning Research*, 2003, pp. 993-1022.] proposed the LDA model by introducing a Dirichlet prior for the topic distributions of the documents. The BPT model herein incorporates the link information available in the corpus in the generative process to model the relationships among the documents. BPT is a more general framework in the sense that LDA is a special case of BPT.

PHITS [D. Cohn and H. Chang, "Learning to probabilistically identify authoritative documents," in *ICML*, 2000, pp. 167-174] is a probabilistic model for links which assumes a generative process for the citations similar to PLSI, and ignores the content of the documents, and characterizes the documents by the citations. Cohn et al. [D. A. Cohn and T. Hofmann, "The missing link—a probabilistic model of document content and hypertext connectivity," in *NIPS*, 2000, pp. 430-436] present a probabilistic model which is a weighted sum of PLSI and PHITS (called "Link-PLSI"). Similarly, Erosheva et al. [E. Erosheva, S. Fienberg, and J. Lafferty, "Mixed membership models of scientific publications," in *Proceedings of the National Academy of Sciences* (2004)] adopt the LDA model in a similar fashion to consider the citations (called "Link-LDA"). Following this line of research, Nallapati et al. [R. Nallapati, A. Ahmed, E. P. Xing, and W. W. Cohen, "Joint latent topic models for text and citations," in *KDD*, 2008, pp. 542-550] propose the Link-PLSI-LDA model which assumes the Link-PLSI model for the cited documents and the Link-LDA model for the citing documents. The common disadvantage of the above studies is that they fail to explicitly consider the relations of the topic distributions between the cited and citing documents and the transitive property of the citations. BPT model herein considers the citations as the observed information to avoid the unnecessary assumption of generating the citations, since the latent topics are of interest instead of the citations.

Shaparenko et al. [B. Shaparenko and T. Joachims, "Information genealogy: uncovering the flow of ideas in non-hyperlinked document databases," in *KDD*, 2007, pp. 619-628] consider the influences among non-hyperlinked documents by modeling one document as a mixture of other documents. Similarly, Dietz et al. [L. Dietz, S. Bickel, and T. Scheffer, "Unsupervised prediction of citation influences," in *ICML*, 2007, pp. 233-240] propose a citation influence model for hyperlinked documents by the citations. The citation influence model, however, fails to capture the multi-level transitive property of the citation network. In addition to the relations represented by the citations, other relations might be also available, for example, the co-author relations among the documents. To model authors' interest, Rosen-Zvi et al. [M. Rosen-Zvi, T. L. Griffiths, M. Steyvers, and P. Smyth, "The author-topic model for authors and documents," in *UAI*, 2004, pp. 487-494] present the author-topic model which extends LDA by including the authors' information. Specifically, the author-topic model considers the topic distribution of a document as a mixture of topic distributions of the authors. Consequently, the author-topic model implicitly considers the relations among the documents through the authors. BPT explicitly considers the relations among the documents in a novel way by modeling the topic distributions at the document level as mixtures of the topic distributions at the citation level.

The present technology therefore provides a system and method, and computer readable media provided to control a general purpose computer to implement a method, or portions thereof, to analyze a set of documents for topics related to their content and their hierarchical linkage relationships to other sets of documents, linked e.g., by citations, cross references, links, or other identifiers, which are typically one-way. A preferred generative model is the Bernoulli Process Topic model. The multi-level structure of the citation network may be captured by a Bernoulli process which generates the related documents, where the related documents are not necessarily directly cited by the given document. A Bayesian treatment of parameter estimation permits generation of a new corpus unavailable in a training stage. The present technology employs a more general paradigm than LDA, and thus is not limited by its constraints. The present technology preferably explicitly considers the relations of the topic distributions between the cited and citing documents and the transitive property of the citations. Preferably, the technology considers the citations as the observed information to avoid the unnecessary assumption of generating the citations, since the latent topics are of interest instead of the citations. The present technology preferably considers the relations among the documents by modeling the topic distributions at the document level as mixtures of the topic distributions at the citation level.

The present technology provides systems and methods for extracting semantic characteristics from a corpus of linked documents by employing both content and link aspects to explicitly capture direct and indirect relations represented by the links, and extracting document topics and the topic distributions for documents in the corpus.

Systems and methods are also disclosed for analyzing a corpus of documents, all are a portion of which having one or more links by forming a hierarchal linkage network using the documents; determining a Bayesian network structure using the one or more links wherein each link implies a content relationship of the linked documents; and generating a content link model based on the content and linkage relationships of the corpus of documents. The content model may be analyzed to distinguish a plurality of topics in the corpus, and to determine a topic distribution for each document.

The content link model captures direct and indirect relationships represented by the links. The system can apply a Bayesian or more generally a probabilistic inference to distinguish document topics. See, e.g., U.S. Pat. No. 7,113,958, and U.S. Pat. No. 6,772,170, each of which is expressly incorporated herein by reference.

The linkage network encodes direct and indirect relations, and wherein relationships may be derived explicitly from links or implicitly from similarities among documents. The obtained topics can be used for characterizing, representing, summarizing, visualizing, indexing, ranking, or searching the documents in the corpus. The topics and the topic distributions can also be used to derive features for document clustering or classification. The extracted topics from the corpus can help improve document organization (e.g., through better indexing and ranking), improve user experiences (e.g., through more efficient searching and higher quality visualization), and provide business values (e.g., in customer opinion analysis) among others.

It is therefore an object of an embodiment to provide a method for characterizing a corpus of documents each having one or more references, comprising:

identifying a network of multilevel hierarchically related documents having direct references, and indirect references, wherein the references are associated with content relationships;

for each respective document, determining a first set of latent topic characteristics based on an intrinsic content of the respective document;

for each document, determining a second set of latent topic characteristics based on a respective content of other documents which are referenced directly and indirectly through at least one other document to the respective document, the indirectly referenced documents contributing transitively to the latent topic characteristics of the respective document;

representing a set of latent topics for the respective document based on a joint probability distribution of at least the first and second sets of latent topic characteristics, dependent on the identified network, wherein the contributions of at least the second set of latent topic characteristics are determined by an iterative process; and storing, in a memory, the represented set of latent topics for the respective document.

The network may comprise a Bayesian network structure.

Relationships among the documents may be modeled by a Bernoulli process such that a topic distribution of each respective document is a mixture of distributions associated with the related documents.

The corpus of documents may be modeled by a generative probabilistic model of a topic content of a corpus along with the references among the documents.

The represented set of latent topics may be modeled at both a document level and a reference level, by differentiating the two different levels and the multilevel hierarchical network which is captured by a Bernoulli random process.

The iterative process at a reference level may comprises iterating, for each document $d_j$, for the i-th location in document $d_j$, choosing a topic $z_{ji}$ from the topic distribution of document $d_j$, $p(z|d_j,\theta_{d_j})$, where the distribution parameter $\theta_{d_j}$ is drawn from a Dirichlet distribution $\text{Dir}(\alpha)$, choosing a word $w_{ji}$ which follows the multinomial distribution $p(w|z_{ji},\Lambda)$ conditioned on the topic $z_{ji}$, and incrementing the locations and documents.

The iterative process at a document level may comprise iterating, for each document $d_s$, for the i-th location in document $d_s$, choosing a referenced document $c_{si}$ from $p(c|d_s,\Xi)$, a multinomial distribution conditioned on the document $d_s$, choosing a topic $t_{si}$ from the topic distribution of the document $c_{si}$ at the reference level, and choosing a word $w_{si}$ which follows the multinomial distribution $p(w|t_{si},\Lambda)$ conditioned on the topic $t_{si}$, where $\Xi$ is a mixing coefficient matrix which represents how much of the content of the respective document is from direct or indirect references, and a composition of $\Xi$ and $\theta$ models the topic distribution at the document level, and incrementing the locations and documents.

For example, a number of latent topics is K and the mixing coefficients are parameterized by an N×N matrix $\Xi$ where $\Xi_{js}=p(c_{si}=d_j|d_s)$, which are treated as a fixed quantity computed from the reference information of the corpus.

The topic distributions at the reference level may be parameterized by a K×N matrix $\Theta$ where $\Theta_{ij}=p(z_{ji}=1|d_j)$, which is to be estimated, and an M×K word probability matrix $\Lambda$, where $\Lambda_{hl}=p(w_{si}^h=1|t_{si}=1)$, which is to be estimated.

The references may comprise citations, each document $d_s$ having a set of citations $Q_{d_s}$, further comprising constructing a matrix S to denote direct relationships among the documents wherein $$s_{ls} = \frac{1}{|Q_{d_s}|} \text{ for } d_l \in Q_{d_s} \text{ and 0 otherwise,}$$

where $|Q_{d_s}|$ denotes the size of the set $Q_{d_s}$, and employing a generative process for generating a related document c from the respective document $d_s$, comprising:

setting l=s;

choosing t~Bernoulli($\beta$);

if t=1, choosing h~Multinomial($S_{.,l}$), where $S_{.,l}$ denotes the l-th column; setting l=h, and returning to said choosing step; and if t=0, letting $c=d_l$, to thereby combine a Bernoulli process and a random walk on a directed graph together, where a transitive property of the citations is captured, wherein the parameter $\beta$ of the Bernoulli process determines a probability that the random walk stops at a current node, and the parameter $\beta$ also specifies how much of the content of the respective document is influenced from the direct or indirect citations.

The generative processes may lead to a joint probability distribution $$p(c, z, D, \Theta|\alpha, \Lambda)|z_{si}, \Lambda) = $$

$$p(\Theta|\alpha) \prod_{s=1}^{N} p(c_s|d_s)p(z_s|c_s) \prod_{i=1}^{L_s} p(w_{si}|z_{si}, \Lambda)$$

where $p(\Theta|\alpha) = \prod_{j=1}^{N} p(\theta_j|\alpha),$ $p(c_s|d_s) = \prod_{i=1}^{L_s} p(c_{si}|d_s),$ and $p(z_s|c_s) = \prod_{i=1}^{L_s} p(z_{si}|c_{si}, \theta_{c_{si}}),$ and a marginal distribution of the corpus can be obtained by integrating over $\Theta$ and summing over c, z $$p(D) = \int \sum_z \sum_c p(c, z, D, \Theta|\alpha, \Lambda)d\Theta =$$

$$B(\alpha)^{-N} \int \left( \prod_{j=1}^{N} \prod_{i=1}^{K} \Theta_{ij}^{\alpha_i - 1} \right) \prod_{s=1}^{N} \prod_{i=1}^{L_s} \sum_{l=1}^{K} \sum_{t=1}^{N} \prod_{h=1}^{M} (\Xi_{ts}\Theta_{lt}\Lambda_{hl})^{w_{si}^h} d\Theta$$

where $B(\alpha) = \prod_{i=1}^{K} \Gamma(\alpha_i) \Big/ \Gamma\left(\sum_{i=1}^{K} \alpha_i\right).$ A joint distribution of c, z, θ is represented as shown in FIG. 3, and iterative update rules applied:

$$\Phi_{sjhl} \propto \Xi_{js}\Lambda_{hl}\exp\left(\Psi(\gamma_{jl}) - \Psi\left(\sum_{t=1}^{K}\gamma_{jt}\right)\right) \quad (2)$$

$$\gamma_{sl} = \alpha_l + \sum_{g=1}^{N}\sum_{h=1}^{M} A_{hg}\Phi_{gshl} \quad (3)$$

$$\Lambda_{hl} \propto \sum_{s=1}^{N}\sum_{j=1}^{N} A_{hs}\Phi_{sjhl} \quad (4)$$

where $A_{hs} = \sum_{i=1}^{L_s} w_{si}^h$ and $\Psi(\cdot)$ digamma function.

Iterative update rules (2), (3), (4), may be performed sequentially until convergence, or for a new corpus, the iterative update rules (2) and (3), performed in order until convergence.

It is also an object of an embodiment to provide a method for characterizing a corpus of documents each having one or more citation linkages, comprising:

identifying a multilevel hierarchy of linked documents having direct references, and indirect references, wherein the citation linkages have semantic significance;

for each respective document, determining latent topic characteristics based on an intrinsic semantic content of the respective document, semantic content associated with directly cited documents, and semantic content associated with documents referenced by directly cited documents, wherein a semantic content significance of a citation has a transitive property;

representing latent topics for documents within the corpus based on a joint probability distribution of the latent topic characteristics; and storing, in a memory, the represented set of latent topics.

Relationships among the corpus of documents may be modeled by a Bernoulli process such that a topic distribution of each respective document is a mixture of distributions associated with the linked documents.

The corpus of documents may be modeled by a generative probabilistic model of a topic content of each document of the corpus of documents along with the linkages among members of the corpus of documents.

The latent topics may be modeled at both a document level and a citation level, and distinctions in the multilevel hierarchical network are captured by a Bernoulli random process.

The joint probability distribution may be estimated by an iterative process at a citation level, comprising, for each document $d_j$, and for the i-th location in document $d_j$, choosing a topic $z_{ji}$ from the topic distribution of document $d_j$, $p(z|d_j,\theta_{d_j})$, where the distribution parameter $\theta_{d_j}$ is drawn from a Dirichlet distribution Dir($\alpha$), choosing a word $w_{ji}$ which follows the multinomial distribution $p(w|z_{ji},\Lambda)$ conditioned on the topic $z_{ji}$, and respectively incrementing the locations and documents.

The joint probability distribution may be estimated by an iterative process at a document level comprising, for each document $d_s$, and for the i-th location in document $d_s$, choosing a cited document $c_{si}$ from $p(c|d_s,\Xi)$, a multinomial distribution conditioned on the document $d_s$, choosing a topic $t_{si}$ from the topic distribution of the document $c_{si}$ at the citation level, and choosing a word $w_{si}$ which follows the multinomial distribution $p(w|t_{si},\Lambda)$ conditioned on the topic $t_{si}$, where $\Xi$ is a mixing coefficient matrix which represents how much of the content of the respective document is from direct or indirect references, and a composition of $\Xi$ and $\theta$ models the topic distribution at the document level, and respectively incrementing the locations and documents.

A number of latent topics K, and the mixing coefficients may be parameterized by an N×N matrix $\Xi$ where $\Xi_{js}=p(c_{si}=d_j|d_s)$, which are treated as a fixed quantity computed from the citation information of the corpus of documents.

Topic distributions at the citation level may be parameterized by a K×N matrix $\Theta$ where $\Theta_{ij}=p(z_{ji}=1|d_j)$, which is to be estimated, and an M×K word probability matrix $\Lambda$, where $\Lambda_{hl}=p(w_{si}^h=1|t_{si}=1)$, which is to be estimated.

Each document $d_s$ may have a set of citations $Q_{d_s}$, the method further comprising constructing a matrix S to denote direct relationships among the documents wherein $$s_{ls} = \frac{1}{|Q_{d_s}|} \text{ for } d_l \in Q_{d_s} \text{ and 0 otherwise,}$$

where $|Q_{d_s}|$ denotes the size of the set $Q_{d_s}$, and employing a generative process for generating a related document c from the respective document $d_s$, comprising:

setting l=s;
choosing t~Bernoulli($\beta$);
if t=1, choosing h~Multinomial($S_{\cdot,l}$) where $S_{\cdot,l}$ denotes the l-th column; setting l=h, and returning to said choosing step; and
if t=0, letting $c=d_l$, to thereby combine a Bernoulli process and a random walk on a directed graph together, where a transitive property of the citations is captured, wherein the parameter $\beta$ of the Bernoulli process determines a probability that the random walk stops at a current node, and the parameter $\beta$ also specifies how much of the content of the respective document is influenced from the direct or indirect citations.

The generative processes lead to a joint probability distribution $$p(c, z, D, \Theta|\alpha, \Lambda)|z_{si}, \Lambda) = $$
$$p(\Theta|\alpha)\prod_{s=1}^{N} p(c_s|d_s)p(z_s|c_s)\prod_{i=1}^{L_s} p(w_{si}|z_{si}, \Lambda)$$

where $p(\Theta|\alpha) = \prod_{j=1}^{N} p(\theta_j|\alpha)$, $p(c_s|d_s) = \prod_{i=1}^{L_s} p(c_{si}|d_s)$, and $p(z_s|c_s) = \prod_{i=1}^{L_s} p(z_{si}|c_{si}, \theta_{c_{si}})$, and a marginal distribution of the corpus can be obtained by integrating over $\Theta$ and summing over c, z $$p(D) = \int \sum_{z}\sum_{c} p(c, z, D, \Theta|\alpha, \Lambda)d\Theta = $$
$$B(\alpha)^{-N}\int\left(\prod_{j=1}^{N}\prod_{i=1}^{K}\Theta_{ij}^{\alpha_i-1}\right)\prod_{s=1}^{N}\prod_{i=1}^{L_s}\sum_{k=1}^{K}\sum_{t=1}^{N}\prod_{h=1}^{M}(\Xi_{ts}\Theta_{lt}\Lambda_{hl})^{w_{si}^h}d\Theta$$

where $B(\alpha) = \prod_{i=1}^{K}\Gamma(\alpha_i)\bigg/\Gamma\left(\sum_{i=1}^{K}\alpha_i\right)$.

A joint distribution of c, z, θ may be represented as:

$\alpha \to \theta \to z \to w_{|c|}$
$d \to c \to t \to w_{|d|}$
$\theta \to t$
$\Xi \to c$
$w_{|c|} \leftarrow \Lambda \to w_{|z|}$ and iterative update rules applied:

$$\Phi_{sjhl} \propto \Xi_{js} \Lambda_{hl} \exp\left(\Psi(\gamma_{jl}) - \Psi\left(\sum_{t=1}^{K} \gamma_{jt}\right)\right) \quad (2)$$

$$\gamma_{sl} = \alpha_l + \sum_{g=1}^{N} \sum_{h=1}^{M} A_{hg} \Phi_{gshl} \quad (3)$$

$$\Lambda_{hl} \propto \sum_{s=1}^{N} \sum_{j=1}^{N} A_{hs} \Phi_{sjhl} \quad (4)$$

where $A_{hs} = \sum_{i=1}^{L_s} w_{si}^h$ and $\Psi(\bullet)$ is a digamma function.

At least the iterative update rules (2) and (3) may be performed in sequence iteratively until convergence within a convergence criterion.

BRIEF DESCRIPTION OF THE DRAWINGS

FIG. 1 shows an illustration of the different topic distributions of the LDA paper at the document level and citation level.

FIG. 2 shows an illustration of the multi-level hierarchical structure of a citation network. Circles represent the papers and arrows represent the citation relationships.

FIG. 3 shows a BPT model using the plate notation.

FIG. 4 shows a graphical model representation of the variation distribution.

FIGS. 5A and 5B show perplexity comparisons on the Cora and CiteSeer datasets (the lower, the better).

FIG. 6 shows topic distributions of the paper "Intelligent Query Answering by Knowledge Discovery Techniques".

FIG. 7 shows topic distributions of the paper "The Megaprior Heuristic for Discovering Protein Sequence Patterns".

FIG. 8 shows a graphical model representation of the latent Dirichlet allocation (LDA). Nodes denote random variables; edges denote dependence between random variables. Shaded nodes denote observed random variables; unshaded nodes denote hidden random variables. The rectangular boxes are "plate notation," which denote replication.

FIG. 9 shows the graphical model for the correlated topic model.

FIG. 10 shows a graphical model representation of a dynamic topic model (for three time slices). Each topic's parameters t,k evolve over time.

DETAILED DESCRIPTION OF THE PREFERRED EMBODIMENTS

Bernoulli Process Topic Model

Figure 11:
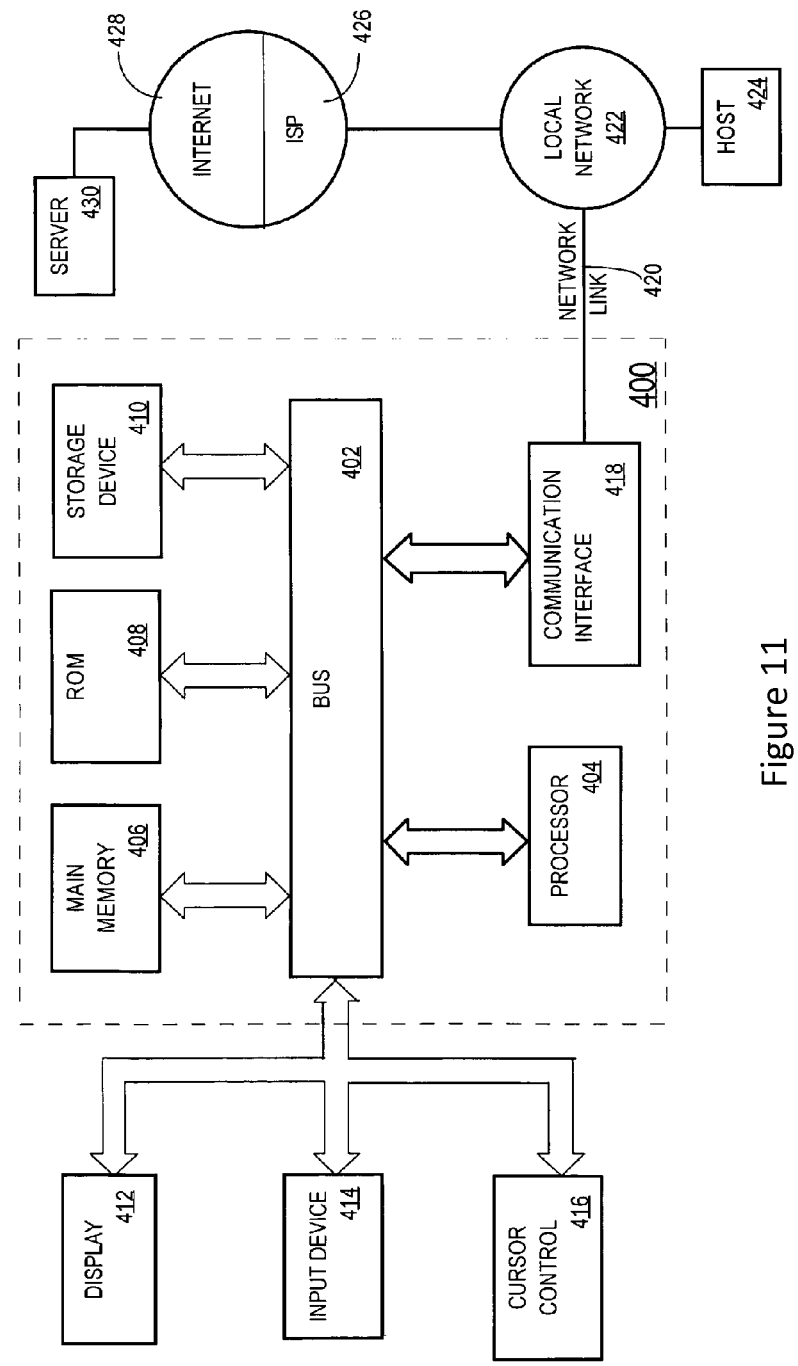
FIG. 11 shows a block diagram of a representative prior art computer system.

The Bernoulli Process Topic (BPT) model is a generative probabilistic model of a corpus along with the citation information among the documents. Similar to the existing topic models, each document is represented as a mixture over latent topics. The key differences from the existing topic models are that the topic distributions of the documents are modeled at two levels (document level and citation level) by differentiating the two different roles and the multi-level hierarchical structure of the citation network which is captured by a Bernoulli random process.

Suppose that the corpus consists of N documents $\{d_j\}_{j=1}^{N}$ in which M distinct words $\{w_i\}_{i=1}^{M}$ occur. A word is represented by a unit vector that has a single entry equal to 1 and all other entries equal to 0. Thus, the l-th word in the vocabulary is represented by an M-dim vector w where $w^l=1$ and $w^h=0$ for $h \neq l$. The s-th document $d_s$ is a sequence of the $L_s$ words denoted by $d_s=(w_{s1}, w_{s2}, \ldots, w_{sL_s})$ where $L_s$ is the length of the document and $w_{si}$ is the vector representing the i-th word in document $d_s$. Thus, the corpus is denoted by $D=(d_1, d_2, \ldots, d_N)$. In addition, each document d might have a set of citations $C_d$, so that the documents are linked together by these citations.

BPT assumes the following generative process for each document in the corpus at the citation level, where the topic distribution of the documents taking the citation role is of interest.

For each document $d_j$.
  For the i-th location in document $d_j$.
    Choose a topic $z_{ji}$ from the topic distribution of document $d_j$, $p(z|d_j, \theta_{d_j})$, where the distribution parameter $\theta_{d_j}$ is drawn from a Dirichlet distribution Dir (α).
    Choose a word $w_{ji}$ which follows the multinomial distribution $p(w|z_{ji}, \Lambda)$ conditioned on the topic $z_{ji}$.

The topic distributions at the citation level reflect the novel ideas instead of those existing approaches. In the illustration example FIG. 1, the topic distribution of the LDA paper at the citation level indicates that "graphical model" and "variational inference" are the two novel ideas in this paper, which are most likely to influence research communities.

Although the topic distributions at the citation level are important in terms of the novel ideas, the content of the document is also of interest. Such information could be obtained from the topic distributions at the document level, which are described in the following generative process.

For each document $d_s$.
  For the i-th location in document $d_s$.
    Choose a related document $c_{si}$ from $p(c|d_s, \Xi)$, a multinomial distribution conditioned on the document $d_s$.
    Choose a topic $t_{si}$ from the topic distribution of the document $c_{si}$ at the citation level, which is described in the previous generative process.
    Choose a word $w_{si}$ which follows the multinomial distribution $p(w|t_{si}, \Lambda)$ conditioned on the topic $t_{si}$.

As shown in the above generative processes, the topic distribution at the document level is a mixture of the topic distributions at the citation level, where Ξ is the mixing coefficient matrix and the composition of Ξ and θ models the topic distribution at the document level. It is worth noting that Ξ represents how much the content of the given document is from direct or indirect citations. Here for the reasons of clarity, t, z are used to represent the latent topics at the document level and citation level, respectively; but they are both the random variables representing the latent topics. The whole generative processes are shown in FIG. 3.

In this generative model, the number of the latent topics is K and the mixing coefficients are parameterized by an N×N matrix Ξ where $\Xi_{js}=p(c_{si}=d_j|d_s)$, which are treated as a fixed quantity computed from the citation information of the corpus. The topic distributions at the citation level are parameterized by a K×N matrix Θ where $\Theta_{lj}=p(z_{ji}=1|d_j)$, which is to be estimated. Similarly, an M×K word probability matrix $\Lambda$, where $\Lambda_{hl}=p(w_{si}^h=1|t_{si}=1)$, needs to be estimated.

Bernoulli Process

Suppose that document $d_s$ has a set of citations $Q_{d_s}$. A matrix S is constructed to denote the direct relationships among the documents in this way:

$$s_{ls} = \frac{1}{|Q_{d_s}|} \text{ for } d_l \in Q_{d_s} \text{ and 0 otherwise,}$$

where $|Q_{d_s}|$ denotes the size of the set $Q_{d_s}$. A simple method to obtain $\Xi$ is to set $\Xi=S$.

However, this simple strategy is not enough to capture the multi-level structure of the citation network. To model the transitive property of the citations, the following generative process is assumed for generating a related document c from the given document $d_s$.

1. Let l=s.
2. Choose t~Bernoulli($\beta$).
3. If t=1, choose h~Multinomial($S_{\cdot,l}$), where $S_{\cdot,l}$ denotes the l-th column; let l=h, and return to Step 2.
4. If t=0, let $c=d_l$.

The above generative process combines a Bernoulli process and a random walk on the directed graph together, where the transitive property of the citations is captured. The parameter $\beta$ of the Bernoulli process determines the probability that the random walk stops at the current node. The parameter $\beta$ also specifies how much of the content of the given document is influenced from the direct or indirect citations.

As a result of the above generative process, $\Xi$ can be obtained according to the following theorem which can be proven by the properties of random walk. The proof is omitted due to the space limitation.

Theorem 1.

The probability matrix $\Xi$ is given as follows $$\Xi = (1-\beta)(I-\beta S)^{-1} \tag{1}$$

When the probability matrix $\Xi$ is an identity matrix, the topic distributions at the document level are identical to those at the citation level. Consequently, BPT reduces to LDA [D. M. Blei, A. Y. Ng, and M. I. Jordan, "Latent Dirichlet Allocation," in *Journal of Machine Learning Research*, 2003, pp. 993-1022]. Equivalently, $\beta=0$ indicates that the relationships among the documents are not considered at all. Thus, LDA is a special case of BPT when $\beta=0$.

Parameter Estimation and Inference

The above generative processes lead to the joint probability distribution $$p(c, z, D, \Theta \mid \alpha, \Lambda) \mid z_{si}, \Lambda) =$$

$$p(\Theta \mid \alpha) \prod_{s=1}^{N} p(c_s \mid d_s) p(z_s \mid c_s) \prod_{i=1}^{L_s} p(w_{si} \mid z_{si}, \Lambda)$$

where $p(\Theta \mid \alpha) = \prod_{j=1}^{N} p(\theta_j \mid \alpha)$, $p(c_s \mid d_s) = \prod_{i=1}^{L_s} p(c_{si} \mid d_s)$, and $$p(z_s \mid c_s) = \prod_{i=1}^{L_s} p(z_{si} \mid c_{si}, \theta_{c_{si}}).$$

The marginal distribution of the corpus can be obtained by integrating over $\Theta$ and summing over c, z $$p(D) = \int \sum_z \sum_c p(c, z, D, \Theta \mid \alpha, \Lambda) d\Theta \tag{1}$$

$$= B(\alpha)^{-N} \int \left( \prod_{j=1}^{N} \prod_{i=1}^{K} \Theta_{ij}^{\alpha_i - 1} \right)$$

$$\prod_{s=1}^{N} \prod_{i=1}^{L_s} \sum_{l=1}^{K} \sum_{t=1}^{N} \prod_{h=1}^{M} (\Xi_{ts} \Theta_{lt} \Lambda_{hl})^{w_{si}^h} d\Theta$$

where $B(\alpha) = \prod_{i=1}^{K} \Gamma(\alpha_i) / \Gamma\left(\sum_{i=1}^{K} \alpha_i\right)$.

Following the principle of maximum likelihood, one needs to maximize Eq. (1) which is intractable to compute due to the coupling between $\Theta$ and $\Lambda$ in the summation. By assuming a particular form of the joint distribution of c, z, $\theta$ as shown in FIG. 3, the following iterative update rules are arrived at by the variational approximation approach.

$$\Phi_{sjhl} \propto \Xi_{js} \Lambda_{hl} \exp\left( \Psi(\gamma_{jl}) - \Psi\left( \sum_{t=1}^{K} \gamma_{jt} \right) \right) \tag{2}$$

$$\gamma_{sl} = \alpha_l + \sum_{g=1}^{N} \sum_{h=1}^{M} A_{hg} \Phi_{gshl} \tag{3}$$

$$\Lambda_{hl} \propto \sum_{s=1}^{N} \sum_{j=1}^{N} A_{hs} \Phi_{sjhl} \tag{4}$$

where $A_{hs} = \sum_{i=1}^{L_s} w_{si}^h$ and $\Psi(\cdot)$ is digamma function. These update rules are performed iteratively in the above order, until convergence. To perform the inference on a new corpus, one only iterates Eqs. (2) and (3) until convergence.

Experimental Evaluations

The BPT model is a probabilistic model towards document modeling. In order to demonstrate the performance of the BPT model, the experiments on the document modeling task are conducted. Moreover, the BPT model is applied to the well-known Cora corpus to discover the latent topics.

Document Modeling

The goal of document modeling is to generalize the trained model from the training dataset to a new dataset. Thus, a high likelihood on a held-out test set is sought to be obtained. In particular, the perplexity of the held-out test set is computed to evaluate the models. A lower perplexity score indicates a better generalization performance. More formally, the perplexity for a test set of N documents is $$\text{perplexity}(D) = \exp\left( -\sum_{i=1}^{N} \log p(d_i) / \sum_{i=1}^{N} L_i \right) \tag{5}$$

In this experiment, two corpora are used: Cora [A. McCallum, K. Nigam, J. Rennie, and K. Seymore, "Automating the construction of internet portals with machine learning," *Inf. Retr.*, vol. 3, no. 2, pp. 127-163, 2000] (see FIG. 5A) and CiteSeer (www.citeseer.ist.psu.edu) (see FIG. 5B), which are the standard datasets with citation information available.

These two datasets both contain the papers published in the conferences and journals of different research areas in computer science including artificial intelligence, information retrieval, hardware, etc. The subsets of these two datasets are used, where Cora contains 9998 documents with 3609 unique words and CiteSeer consists of 9135 documents with 889 words. Each dataset is randomly split into two parts (70% and 30%), with the 70% used to train the model and the 30% used as the held-out test set. The BPT model is evaluated against LDA [D. M. Blei, A. Y. Ng, and M. I. Jordan, "Latent dirichlet allocation," in *Journal of Machine Learning Research*, 2003, pp. 993-1022] and Link-LDA [E. Erosheva, S. Fienberg, and J. Lafferty, "Mixed membership models of scientific publications," in *Proceedings of the National Academy of Sciences* 2004], where Link-LDA incorporates the citation information into the LDA model. FIG. 6 shows the perplexity results on these two corpora where the number of the topics varies from 10 to 200 and the parameter β in the BPT model is simply fixed at 0.99. As can be seen, the BPT model achieves a significant improvement on the generalization performance.

BPT Model for Cora

To discover the latent topics in details, the BPT model is applied to Cora with the number of the topics fixed at 300. The parameter β is also fixed at 0.99. A large number of applications are possible based on the learned 300 topic model. The LDA [D. M. Blei, A. Y. Ng, and M. I. Jordan, "Latent Dirichlet Allocation," in *Journal of Machine Learning Research*, 2003, pp. 993-1022] and Link-LDA [E. Erosheva, S. Fienberg, and J. Lafferty, "Mixed membership models of scientific publications," in *Proceedings of the National Academy of Sciences*, 2004] models are also applied to Cora corpus with the same number of the topics for comparison.

Topic Distributions at Two Levels

One main advantage of the B PT model is the capacity of differentiating the two roles of the documents. Several research topics related to data mining field are chosen, to investigate the topic probabilities at the document level and citation level. FIG. 1 illustrates the topic probabilities of the paper "Intelligent Query Answering by Knowledge Discovery Techniques" by Jiawei Han et al. in the data mining field, where each topic is denoted by several representative words following the order of the topic. The topic probability conditioned on this paper has a high value on the data mining topic at the document level as expected. However, the topics which this paper has the most influence on, are the research topics related to decision tree and information retrieval, instead of data mining, as indicated at the citation level distribution. In other words, this paper is most likely to be cited by the papers related to decision tree and information retrieval.

Another example is from the computational biology field. Since computational biology is an interdisciplinary field where machine learning and image processing techniques play the active roles, the research in the computational biology is very likely to influence these related research areas. FIG. 2 shows the related topic distributions of the paper "The Megaprior Heuristic for Discovering Protein Sequence Patterns" by Timothy L. Bailey et al. Clearly, the probability of the computational biology topic at the document level is the highest. Yet the research topics related to image processing and classification are more likely to be influenced by this paper as indicated at the citation level distribution.

| Paper title | $p(c \mid z)$ | C-Cora | C-GS |
|---|---|---|---|
| Data Mining | | | |
| Knowledge Discovery in Databases: An Attribute-Oriented Approach | 0.977229 | 19 | 354 |
| Bottom-up Induction of Functional Dependencies from Relations | 0.005908 | 2 | 47 |
| Fast Spatio-Temporal Data Mining of Large Geophysical Datasets | 0.001346 | 2 | 62 |
| OLAP Analysis | | | |
| Data Cube: A Relational Aggregation Operator Generalizing Group-By, Cross-Tab, and SubTotals | 0.733346 | 26 | 1469 |
| Query Evaluation Techniques for Large Databases | 0.078250 | 24 | 990 |
| The SEQUOIA 2000 storage benchmark | 0.036707 | 2 | 201 |
| Speech Recognition | | | |
| A Telephone Speech Database of Spelled and Spoken Names | 0.118541 | 6 | 34 |
| ASCII Phonetic Symbols for the World's Languages: Worldbet | 0.109741 | 6 | 92 |
| Fast Speakers in Large Vocabulary Continuous Speech Recognition: Analysis & Antidotes | 0.095960 | 5 | 48 |
| Network QoS Services | | | |
| A generalized processor sharing approach to flow control in integrated services networks: The single node | 0.957520 | 75 | 2370 |
| Comparison of Rate-Based Service Disciplines | 0.015441 | 32 | 311 |
| A Scheduling Discipline and Admission Control Policy for Xunet 2 | 0.003878 | 6 | 13 |

Citation Recommendation

The underlying assumption in the Link-LDA and LDA models is that the documents are independent of each other, which implies the topic distributions of the documents are also independent. This assumption leads to an issue in computing the posterior probability of the documents conditioned on the given topic. According to $p(d|t) \propto p(t|d)p(d)$, one would expect that a longer document (larger $p(d)$) is likely to have a larger posterior probability because the topic distribution of document $p(t|d)$ is assumed to be independent of the document length in the Link-LDA and LDA models. However, intuitively the topic distribution of a document should not be mainly determined by its length. The paper "Building Domain-Specific Embedded Languages" is the longest document in Cora corpus. In the evaluations on the Link-LDA and LDA models, this paper has the largest posterior probability for most of the topics, as expected, which does not make reasonable sense. The above issue is addressed by the BPT model by explicitly considering the relations among the documents represented by the citations. In the BPT model, the topic distribution of a given document $p(t|d)$ is related to other documents because it is a mixture of the topic distributions of other documents at the citation level. This is also verified by the experiments on the Cora corpus. In the BPT model, the documents with a high posterior probability are directly related to the given topic, instead of being determined by the document length. Experimental results are available online [www.cs.binghamton.edu/~zguo/icdm09, expressly incorporated herein by reference].

Since the topic distributions of the documents at the citation level (the matrix Θ) are directly modeled in the BPT model, it is natural to recommend the most influential citations in the given topic by computing the posterior probabilities $p(c|z)$. Table 2 shows the citations recommended by the BPT model in several research topics. Since Cora only covers the research papers before 1999, the citation count from Google Scholar is much more than that in Cora. The top 20 citations recommended in all research topics discovered by BPT are also available online [www.cs.binghamton.edu/~zguo/icdm09].

A multi-level latent topic model, BPT, differentiates the two different roles of each document in a corpus: document itself and a citation of other documents, by modeling the corpus at two levels: document level and citation level. Moreover, the multi-level hierarchical structure of the citation network is captured by a generative process involving a Bernoulli process. The experimental results on the Cora and CiteSeer corpora demonstrate that the BPT model provides a promising knowledge discovery capability.

Hardware Overview

FIG. 11 (see U.S. Pat. No. 7,702,660, issued to Chan, expressly incorporated herein by reference), shows a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In this description, several preferred embodiments were discussed. Persons skilled in the art will, undoubtedly, have other ideas as to how the systems and methods described herein may be used. It is understood that this broad invention is not limited to the embodiments discussed herein. Rather, the invention is limited only by the following claims.

REFERENCES

Each of the following references (and associated appendices and/or supplements) is expressly incorporated herein by reference in its entirety:

Airoldi, E., Blei, D., Fienberg, S., and Xing, E. (2007). Combining stochastic block models and mixed membership for statistical network analysis. In Statistical Network Analysis: Models, Issues and New Directions, Lecture Notes in Computer Science, pages 57-74. Springer-Verlag. In press.

Airoldi, E., Blei, D., S. Fienberg, and E. Xing. Mixed membership stochastic blockmodels. Journal of Machine Learning Research, 9:1981-2014, 2008.

Aitchison, J. (1982). The statistical analysis of compositional data. Journal of the Royal Statistical Society, Series B, 44(2):139-177.

Alzer, H.2003. Inequalities for the beta function of n variables. ANZIAM Journal 44:609-623.

Amizadeh, Saeed, Milos Hauskrecht: Latent Variable Model for Learning in Pairwise Markov Networks.

Baeza-Yates, R. and Ribeiro-Neto, B. (1999). Modern Information Retrieval. ACM Press, New York.

Barnard, K., P. Duygulu, N. de Freitas, D. Forsyth, Blei, D., and M. Jordan. Matching words and pictures. Journal of Machine Learning Research, 3:1107-1135, 2003.

Basu, Sumit, Danyel Fisher, Steven M. Drucker, Hao Lu: Assisting Users with Clustering Tasks by Combining Metric Learning and Classification.

Beal, M. (2003). Variational algorithms for approximate Bayesian inference. PhD thesis, Gatsby Computational Neuroscience Unit, University College London.

Blei, D. and J. Lafferty. Topic Models. In A. Srivastava and M. Sahami, editors, Text Mining Theory and Applications. Taylor and Francis, 2009.

Blei, D. and J. Lafferty. Correlated Topic Models. Neural Information Processing Systems, 2006.

Blei, D. and J. Lafferty. Dynamic topic models. In Proceedings of the 23rd International Conference on Machine Learning, 2006.

Blei, D. and Jordan, M. (2003). Modeling annotated data. In Proceedings of the 26th annual International ACM SIGIR Conference on Research and Development in Information Retrieval, pages 127-134. ACM Press.

Blei, D. and Jordan, M. (2005). Variational inference for Dirichlet process mixtures. Journal of Bayesian Analysis, 1(1):121-144.

Blei, D. and L. Kaelbling. Shortest paths in a dynamic uncertain domain. In IJCAI Workshop on Adaptive Spatial Representations of Dynamic Environments, 1999.

Blei, D. and Lafferty, J. (2006). Dynamic topic models. In Proceedings of the 23rd International Conference on Machine Learning, pages 113-120.

Blei, D. and Lafferty, J. (2007). A correlated topic model of Science. Annals of Applied Statistics, 1(1):17-35.

Blei, D. and M. Jordan. Variational inference for Dirichlet process mixtures. Journal of Bayesian Analysis, 1[1]:121-144, 2006.

Blei, D. and P. Frazier. Distance dependent Chinese restaurant processes. International Conference on Machine Learning, 2010.

Blei, D. and P. Moreno. Topic segmentation with an aspect hidden Markov model. In Proceedings of the 24th annual international ACM SIGIR conference on Research and development in information retrieval, pages 343-348. ACM Press, 2001.

Blei, D. M., A. Y. Ng, and M. I. Jordan, "Latent dirichlet allocation," in Journal of Machine Learning Research, 2003, pp. 993-1022.

Blei, D., A. Ng, and M. Jordan. Hierarchical Bayesian models for applications in information retrieval. In J. Bernardo, J. Berger, A. Dawid, D. Heckerman, A. Smith, and M. West, editors, Bayesian Statistics 7, volume 7, pages 25-44. Oxford University Press, 2003.

Blei, D., J. Bagnell, and A. McCallum. Learning with scope, with application to information extraction and classification. In Uncertainty in Artificial Intelligence: Proceedings of the Eighteenth Conference [UAI-2002], pages 53-60, San Francisco, Calif., 2002. Morgan Kaufmann Publishers.

Blei, D., J. McAuliffe. Supervised topic models. Neural Information Processing Systems 21, 2007.

Blei, D., Probabilistic Models of Text and Images. PhD thesis, U.C. Berkeley, Division of Computer Science, 2004.

Blei, D., T. Griffiths, and M. Jordan. The nested Chinese restaurant process and Bayesian nonparametric inference of topic hierarchies. Journal of the ACM, 57:2 1-30, 2010.

Blei, D., T. Griffiths, M. Jordan, and J. Tenenbaum. Hierarchical topic models and the nested Chinese restaurant process. Neural Information Processing Systems 16, 2003.

Boyd-Graber, J., and Blei, D., Multilingual topic models for unaligned text. Uncertainty in Artificial Intelligence, 2009.

Boyd-Graber, J., and Blei, D., Syntactic topic models. Neural Information Processing Systems, 2008.

Boyd-Graber, J., Blei, D., and X. Zhu. A topic model for word sense disambiguation. In Empirical Methods in Natural Language Processing, 2007.

Buntine, W. and Jakulin, A. (2004). Applying discrete PCA in data analysis. In Proceedings of the 20th Conference on Uncertainty in Artificial Intelligence, pages 59-66. AUAI Press.

Chang, J., and Blei, D., Hierarchical relational models for document networks. Annals of Applied Statistics, 4(1): 124-150, 2010.

Chang, J., and B lei, D., Relational Topic Models for Document Networks. Artificial Intelligence and Statistics, 2009.

Chang, J., J. Boyd-Graber, and Blei, D., Connections between the lines: Augmenting social networks with text. Knowledge Discovery and Data Mining, 2009.

Chang, J., J. Boyd-Graber, S. Gerrish, C. Wang, and Blei, D., Reading tea leaves: How humans interpret topic models. Neural Information Processing Systems, 2009.

Chen, Yuqiang, Ou Jin, Gui-Rong Xue, Jia Chen, Qiang Yang: Visual Contextual Advertising: Bringing Textual Advertisements to Images.

Cohen, S., Blei, D., and N. Smith. Variational inference for adaptor grammars. North American Chapter of the Association for Computational Linguistics, 2010.

Cohn, D. A., and T. Hofmann, "The missing link—a probabilistic model of document content and hypertext connectivity," in NIPS, 2000, pp. 430-436.

Cohn, D., and H. Chang, "Learning to probabilistically identify authoritative documents," in ICML, 2000, pp. 167-174.

de Campos, Cassio Polpo, Qiang Ji: Properties of Bayesian Dirichlet Scores to Learn Bayesian Network Structures.

Deerwester, S., Dumais, S., Landauer, T., Furnas, G., and Harshman, R. (1990). Indexing by latent semantic analysis. Journal of the American Society of Information Science, 41(6):391-407.

Dietz, L., S. Bickel, and T. Scheffer, "Unsupervised prediction of citation influences," in ICML, 2007, pp. 233-240.

Dudik, M., Blei, D., and R. Schapire. Hierarchical maximum entropy density estimation. Proceedings of the 24th International Conference on Machine Learning, 2007.

Erosheva, E., Fienberg, S., and Joutard, C. (2007). Describing disability through individual-level mixture models for multivariate binary data. Annals of Applied Statistics.

Erosheva, E., S. Fienberg, and J. Lafferty, "Mixed membership models of scientific publications," in Proceedings of the National Academy of Sciences, Apr. 6, 2004; 97(22): 11885-11892, 101 Suppl 1:5220-7; Epub 2004 Mar. 12.

Fei-Fei, L. and Perona, P. (2005). A Bayesian hierarchical model for learning natural scene categories. IEEE Computer Vision and Pattern Recognition, pages 524-531.

Fox, Maria, David Poole (Eds.): Proceedings of the Twenty-Fourth AAAI Conference on Artificial Intelligence, AAAI 2010, Atlanta, Ga., USA, Jul. 11-15, 2010. AAAI Press 2010

Fraley, C. and Raftery, A. (2002). Model-based clustering, discriminant analysis, and density estimation. Journal of the American Statistical Association, 97(458):611-631.

Gelman, A., Carlin, J., Stern, H., and Rubin, D. (1995). Bayesian Data Analysis. Chapman & Hall, London.

Gerrish, S., and Blei, D., A language-based approach to measuring scholarly impact. International Conference on Machine Learning, 2010.

Gershman, S., Blei, D., and Y. Niv. Context, Learning and Extinction Psychological Review 117:1 197-209, 2010.

Ghafoor, Arif, Zhang, Zhongfei (Mark), Michael S. Lew, and Zhi-Hua Zhou, Guest Editors' Introduction to Machine Learning Approaches to Multimedia Information Retrieval, ACM Multimedia Systems Journal, Springer, August, 2006, Volume 12, No. 1, pp 1-2

Gilmour, Duane, and Zhang, Zhongfei (Mark), Determining Course of Action Alignment with Operational Objectives, Proc. the 11th International Command and Control Research and Technology Symposium, Cambridge, UK, September, 2006, (accepted)

Griffiths, T. and Steyvers, M. (2004). Finding scientific topics. Proceedings of the National Academy of Science.

Griffiths, T., Steyvers, M., Blei, D., and Tenenbaum, J. (2005). Integrating topics and syntax. In Saul, L. K., Weiss, Y., and Bottou, L., editors, Advances in Neural Information Processing Systems 17, pages 537-544, Cambridge, Mass. MIT Press.

Gu, Weikang, Zhongfei Zhang, and Renjie Jing, Direct Matching among 3D Point-Sets in Scene Analysis, Proc. of IEEE International Conference on Systems, Man, Cybernetics, International Academic Publishers, August, 1988, pp 1038-1041

Guo, Zhen, Shenghuo Zhu, Yun Chi, Zhang, Zhongfei (Mark), and Yihong Gong, A latent topic model for linked documents, Proc. ACM International Conference SIGIR, Boston, Mass., USA, July, 2009

Guo, Zhen, Shenghuo Zhu, Zhang, Zhongfei (Mark), Yun Chi, Yihong Gong, "A Topic Model for Linked Documents and Update Rules for Its Estimation", Proceedings of the Twenty-Fourth AAAI Conference on Artificial Intelligence (AAAI-10), Atlanta Ga., pp. 463-468 (2010)

Guo, Zhen, Zhang, Zhongfei (Mark), Eric P. Xing, and Christos Faloutsos, Semi-supervised learning based on semi-parametric regularization, Proc. the SIAM International Conference on Data Mining, Atlanta, Ga., 2008.

Guo, Zhen, Zhang, Zhongfei (Mark), Eric P. Xing, and Christos Faloutsos, Enhanced Max Margin Learning on Multimodal Data Mining in a Multimedia Database, Proc. the 13th ACM SIGKDD International Conference on Knowledge Discovery and Data Mining, San Jose, Calif., USA, August, 2007.

Guo, Zhen, Zhang, Zhongfei (Mark), Eric P. Xing, and Christos Faloutsos, A Max Margin Framework on Image Annotation and Multimodal Image Retrieval, Proc. the IEEE Annual International Conference on Multimedia and Expo, Beijing, China, July, 2007 Guo, Zhen, Zhang, Zhongfei (Mark), Shenghuo Zhu, Yun Chi, Yihong Gong, "Knowledge Discovery from Citation Networks", ICDM '09, Ninth IEEE International Conference on Data Mining, Miami Fla., pp. 800-805 (2009).

Hannah, L., Blei, D., and W. Powell. Dirichlet process mixtures of generalized linear models. Artificial Intelligence and Statistics, 2010.

Hannah, L., W. Powell, and Blei, D., Nonparametric Density Estimation for Stochastic Optimization with an Observable State Variable Neural Information Processing Systems, 2010.

Hoffman, M., Blei, D., and F. Bach. Online Learning for Latent Dirichlet Allocation Neural Information Processing Systems, 2010.

Hoffman, M., Blei, D., and P. Cook. Bayesian nonparametric matrix factorization for recorded music. International Conference on Machine Learning, 2010.

Hoffman, M., Blei, D., and P. Cook. Easy as CBA: A simple probabilistic model for tagging music. International Conference on Music Information Retrieval, 2009.

Hoffman, M., Blei, D., and P. Cook. Content-based musical similarity computation using the hierarchical Dirichlet process. In International Conference on Music Information Retrieval, 2008.

Hoffman, M., Blei, D., P. Cook. Finding Latent Sources in Recorded Music With a Shift-Invariant HDP. International Conference on Digital Audio Effects, 2009.

Hoffman, M., P. Cook, and Blei, D., Bayesian spectral matching: Turning Young MC into MC Hammer via MCMC sampling International Computer Music Conference, 2009.

Hoffman, M., P. Cook, and Blei, D., Data-driven recomposition using the hierarchical Dirichlet process hidden Markov model. In International Computer Music Conference, 2008.

Hofmann, T. (1999). Probabilistic latent semantic indexing. Research and Development in Information Retrieval, in SIGIR, pages 50-57.

Jordan, M., Ghahramani, Z., Jaakkola, T., and Saul, L. (1999). Introduction to variational methods for graphical models. Machine Learning, 37:183-233.

Kalman, R. (1960). A new approach to linear filtering and prediction problems a new approach to linear filtering and prediction problems,". Transaction of the AMSE: Journal of Basic Engineering, 82:35-45.

Kaplan, D., and Blei, D., A computational approach to style in American poetry. In IEEE Conference on Data Mining, 2007.

Kataria, Saurabh, Prasenjit Mitra, Sumit Bhatia: Utilizing Context in Generative Bayesian Models for Linked Corpus.

Lee, D. and Seung, H. (1999). Learning the parts of objects by non-negative matrix factorization. Nature, 401(6755):788-791.

Lee, D. D., and Seung, H. S. 2000. Algorithms for nonnegative matrix factorization. In NIPS, 556-562.

Li, Fangtao, Minlie Huang, Xiaoyan Zhu: Sentiment Analysis with Global Topics and Local Dependency.

Li, J., C. Wang, Y. Lim, Blei, D., and L. Fei-Fei. Building and using a semantivisual image hierarchy. Computer Vision and Pattern Recognition, 2010.

Li, Ming, Zhang, Zhongfei (Mark), and Zhi-Hua Zhou, Mining Bulletin Board Systems Using Community Generatio, Proc. Pacific and Asia Knowledge Discovery and Data Mining Conference, Osaka, Japan, May 2008.

Li, Pei-Pei, Xindong Wu, Xuegang Hu: Learning from Concept Drifting Data Streams with Unlabeled Data.

Li, W., Blei, D., and A. McCallum. Nonparametric Bayes pachinko allocation. In The 23rd Conference on Uncertainty in Artificial Intelligence, 2007.

Li, Xi, Weiming Hu, and Zhang, Zhongfei (Mark), Corner Detection of Contour Images Using Spectral Clustering, Proc. the 14th IEEE International Conference on Image Processing, San Antonio, Tex., USA, September, 2007

Li, Xi, Weiming Hu, Zhang, Zhongfei (Mark), and Yang Liu, Spectral Graph Partitioning Based on A Random Walk Diffusion Similarity Measure, Proc. Asian Conference on Computer Vision, XiAn, China, September, 2009

Li, Xi, Weiming Hu, Zhang, Zhongfei (Mark), Xiaoqin Zhang, and Quan Luo, Robust Visual Tracking Based on Incremental Tensor Subspace Learning, Proc. the IEEE International Conference on Computer Vision, Rio de Janeiro, Brazil, October, 2007

Li, Xi, Weiming Hu, Zhongfei Zhang, and Xiaoqin Zhang, Robust Visual Tracking Based on An Effective Appearance Model, Proc. European Computer Vision Conference, Marseille, France, October, 2008

Li, Xi, Weiming Hu, Zhongfei Zhang, Xiaoqin Zhang, and Guan Luo, Trajectory-Based Video Retrieval Using Dirichlet Process Mixture Models, Proc. British Machine Vision Conference, Leeds, UK, September, 2008

Li, Xi, Weiming Hu, Zhongfei Zhang, Xiaoqin Zhang, Mingliang Zhu, Jian Cheng, and Guan Luo, Visual tracking via incremental log-Euclidean Riemannian subspace learning, Proc. IEEE Computer vision and Pattern Recognition, Anchorage, Ak., USA, June 2008.

Li, Xi, Weiming Hu, Zhongfei Zhang, Xiaoqin Zhang, Robust Foreground Segmentation Based on Two Effective Background Models, Proc. ACM International Conference on Multimedia Information and Retrieval, Vancouver, Canada, October, 2008

Li, Xi, Zhongfei Zhang, Yanguo Wang, and Weiming Hu, Multiclass Spectral Clustering Based on Discriminant Analysis, Proc. International Conference on Pattern Recognition, Tempa, Fla., USA, December, 2008

Long, Bo, Philip S. Yu and Zhang, Zhongfei (Mark), A general model for multiple view unsupervised learning, Proc. the SIAM International Conference on Data Mining, Atlanta, Ga., 2008.

Long, Bo, Xiaoyun Wu, Zhang, Zhongfei (Mark), and Philip S. Yu, Community Learning by Graph Approximation, Proc. the IEEE International Conference on Data Mining, Omaha, Nebr., USA, October, 2007.

Long, Bo, Xiaoyun Wu, Zhang, Zhongfei (Mark), and Philip S. Yu, Unsupervised Learning on K-partite Graphs, Proc. ACM International Conference on Knowledge Discovery and Data Mining, ACM Press, Philadelphia, Pa., USA, August, 2006

Long, Bo, Zhang, Zhongfei (Mark), and Philip S. Yu, A General Framework for Relation Graph Clustering, Knowledge and Information Systems Journal, Elsevier Science Press, Accepted, 2009

Long, Bo, Zhang, Zhongfei (Mark), and Philip S. Yu, A Probabilistic Framework for Relational Clustering, Proc. the 13th ACM International Conference on Knowledge Discovery and Data Mining, San Jose, Calif., USA, August, 2007

Long, Bo, Zhang, Zhongfei (Mark), and Philip S. Yu, Co-clustering by Block Value Decomposition, Proc. ACM International Conference on Knowledge Discovery and Data Mining, ACM Press, Chicago, Ill., August, 2005

Long, Bo, Zhang, Zhongfei (Mark), and Philip S. Yu, Combining Multiple Clusterings by Soft Correspondence, Proc. IEEE International Conference on Data Mining, IEEE Computer Society Press, New Orleans, La., November, 2005

Long, Bo, Zhang, Zhongfei (Mark), and Philip S. Yu, Graph Partitioning Based on Link Distribution, Proc. the 22nd Annual Conference on Artificial Intelligence (AAAI-07), Vancouver, British Columbia, Canada, July, 2007

Long, Bo, Zhang, Zhongfei (Mark), and Philip S. Yu, Relational Clustering by Symmetric Convex Coding, Proc. the 24th Annual International Conference on Machine Learning, Oregon State University, OR, USA, June, 2007

Long, Bo, Zhang, Zhongfei (Mark), and Tianbing Xu, Clustering on Complex Graphs, Proc. 23th Conference on Artificial Intelligence (AAAI 2008), Chicago, Ill., USA, July, 2008.

Long, Bo, Zhang, Zhongfei (Mark), Xiaoyun Wu, and Philip S. Yu, A General Model for Relational Clustering, Proc. International Workshop on Open Problems in Statistical Relational Learning, ACM Press, Pittsburgh, Pa., USA, June, 2006

Long, Bo, Zhang, Zhongfei (Mark), Xiaoyun Wu, and Philip S. Yu, Spectral Clustering for Multi-Type Relational Data, Proc. International Conference on Machine Learning, ACM Press, Pittsburgh, Pa., USA, June, 2006

Long, Bo, Zhang, Zhongfei (Mark), and Philip S. Yu, Relational Data Clustering: Models, Algorithms, and Applications, Taylor & Francis/CRC Press, 2009, ISBN: 9781420072617

Lorbert, A., D. Eis, V. Kostina, Blei, D., and P. Ramadge. Exploiting covariate similarity in sparse regression via the pairwise elastic net. Artificial Intelligence and Statistics, 2010.

Lovasz, L., and Plummer, M. D. 1986. Matching Theory (North-Holland mathematics studies). Elsevier Science Ltd.

Mau, B., Newton, M., and Larget, B. (1999). Bayesian phylogenies via Markov Chain Monte Carlo methods. Biometrics, 55:1-12.

McAuliffe, J., Blei, D., and M. Jordan. Nonparametric empirical Bayes for the Dirichlet process mixture model. Statistics and Computing, 16[1]:5-14, 2006. [Springer]

McCallum, A, K. Nigam, J. Rennie, and K. Seymore, "Automating the construction of internet portals with machine learning," Inf. Retr., vol. 3, no. 2, pp. 127-163, 2000.

McLachlan, G. and Peel, D. (2000). Finite mixture models. Wiley-Interscience.

Minka, T., and Lafferty, J. 2002. Expectation-propagation for the generative aspect model. In Proceedings of the 18th Conference on Uncertainty in Artificial Intelligence, 352-359. Morgan Kaufmann.

Mukherjee, I., and Blei, D., Relative performance guarantees for approximate inference in latent Dirichlet allocation. Neural Information Processing Systems, 2008.

Nallapati, R., A. Ahmed, E. P. Xing, and W. W. Cohen, "Joint latent topic models for text and citations," in KDD, 2008, pp. 542-550.

Nigam, K., McCallum, A., Thrun, S., and Mitchell, T. (2000). Text classification from labeled and unlabeled documents using EM. Machine Learning, 39(2/3):103-134.

Paul, Michael, Roxana Girju: A Two-Dimensional Topic-Aspect Model for Discovering Multi-Faceted Topics.

Ping, Wei, Ye Xu, Kexin Ren, Chi-Hung Chi, Shen Furao: Non-I.I.D. Multi-Instance Dimensionality Reduction by Learning a Maximum Bag Margin Subspace.

Pintilie, Stefan, Ali Ghodsi: Conformal Mapping by Computationally Efficient Methods.

Porteous, Ian, Arthur Asuncion, Max Welling: Bayesian Matrix Factorization with Side Information and Dirichlet Process Mixtures.

Pritchard, J., Stephens, M., and Donnelly, P. (2000). Inference of population structure using multilocus genotype data. Genetics, 155:945-959.

Purver, M., K"ording, K., Griffiths, T., and Tenenbaum, J. (2006). Unsupervised topic modelling for multi-party spoken discourse. In ACL.

Qian, Buyue, Ian Davidson: Semi-Supervised Dimension Reduction for Multi-Label Classification.

Rabiner, L. R. (1989). A tutorial on hidden Markov models and selected applications in speech recognition. Proceedings of the IEEE, 77:257-286.

Rao, Aibing, Rohini K. Srihari, and Zhongfei Zhang, Geometric Histogram: A Distribution of Geometric Configurations of Color Subsets, Proc. of SPIE, Volume 3964, Internet Imaging, SPIE Press, San Jose, Calif., Jan. 26-28, 2000, pp 91-101

Rao, Aibing, Rohini K. Srihari, and Zhongfei Zhang, Spatial Color Histograms for Content-Based Image Retrieval, Proc. IEEE Computer Society Eleventh Conference on Tools with Artificial Intelligence, IEEE Computer Society Press, Chicago, Ill., Nov. 9-11, 1999, pp 183-186

Rosen-Zvi, M., Griffiths, T., Steyvers, M., and Smith, P. (2004). The author-topic model for authors and documents. In Proceedings of the 20th Conference on Uncertainty in Artificial Intelligence, pages 487-494. AUAI Press.

Russell, B., Efros, A., Sivic, J., Freeman, W., and Zisserman, A. (2006). Using multiple segmentations to discover objects and their extent in image collections. In IEEE Conference on Computer Vision and Pattern Recognition, pages 1605-1614.

Shaparenko, B, and T. Joachims, "Information genealogy: uncovering the flow of ideas in non-hyperlinked document databases," in KDD, 2007, pp. 619-628.

Shen, Bin, Luo Si: Non-Negative Matrix Factorization Clustering on Multiple Manifolds.

Shen, Bing, Zhang, Zhongfei (Mark), and Chunfa Yuan, Person name identification in Chinese documents using finite state automata, IEEE Int'l Conf. on Intelligent Agent Technology, Halifax, Canada, October, 2003

Shi, J., and Malik, J. 2000. Normalized cuts and image segmentation. IEEE Trans. Pattern Anal. Mach. Intell. 22(8): 888-905.

Socher, R., S. Gershman, A. Perotte, P. Sederberg, Blei, D., and K. Norman. A Bayesian analysis of dynamics in free recall. Neural Information Processing Systems, 2009.

Song, Yangqiu, Shimei Pan, Shixia Liu, Furu Wei, Michelle X. Zhou, Weihong Qian: Constrained Coclustering for Textual Documents.

Srihari, Rohini K., and Zhongfei Zhang, Combining Text and Image Context in Data Mining for the WWW, Proc. IEEE Conference on Dual Use of Technology and Applications, IEEE Press, May, 1997, pp 112-116

Srihari, Rohini K., and Zhongfei Zhang, Exploiting Multimodal Context in Image Retrieval, Library Trends, Special Issue on Progress in Visual Information Retrieval, the University of Illinois Press, Vol. 48, Fall, 1999, pp 496-520

Srihari, Rohini K., and Zhongfei Zhang, Finding Pictures In Context, Proc. of IAPR International Workshop on Multimedia Information Analysis & Retrieval, Springer-Verlag Press, Hong Kong, August, 1998, pp 109-123

Srihari, Rohini K., and Zhongfei Zhang, Show&Tell: A Multimedia System for Semi-Automated Image Annotation, IEEE Multimedia, IEEE Computer Society Press, Vol. 7, No. 3, July-September, 2000, pp 61-71

Srihari, Rohini K., Zhongfei Zhang, and Aibing Rao, Image Background Search: Combining Object Detection Techniques into Content-Based Similarity Image Retrieval[CBSIR] Systems, Proc. of IEEE International Workshop on Content-Based Access of Image and Video Libraries, IEEE Press, Fort Collins, Colo., USA, June, 1999, pp 97-101.

Srihari, Rohini K., Zhongfei Zhang, and Aibing Rao, Intelligent Indexing and Semantic Retrieval of Multimodal Documents, International Journal of Information Retrieval, special issue on Document Analysis, Kluwer Academic Publishers, Vol. 2, No. 2/3, May, 2000, pp 245-275

Srihari, Rohini K., Zhongfei Zhang, and Rajiv Chopra, Using Speech Input for Image Interpretation and Annotation, Proc. AAAI Spring Symposium}, Stanford University, CA, March, 1997, pp 17-24.

Srihari, Rohini K., Zhongfei Zhang, Mahesh Venkatraman, and Rajiv Chopra, Using Speech Input for Image Interpretation and Annotation, Proc. Image Understanding Workshop, Morgan Kaufmann Publishers, Inc., February, 1996, pp 501-510

Steyvers, M. and Griffiths, T. (2006). Probabilistic topic models. In Landauer, T., McNamara, D., Dennis, S., and Kintsch, W., editors, Latent Semantic Analysis: A Road to Meaning. Laurence Erlbaum.

Stoilos, Giorgos, Bernardo Cuenca Grau, Ian Horrocks: How Incomplete Is Your Semantic Web Reasoner?

Straccia, Umberto, Nuno Lopes, Gergely Lukacsy, Axel Polleres: A General Framework for Representing and Reasoning with Annotated Semantic Web Data.

Sun, Yu-Yin, Michael K. Ng, Zhi-Hua Zhou: Multi-Instance Dimensionality Reduction.

Sun, Yu-Yin, Yin Zhang, Zhi-Hua Zhou: Multi-Label Learning with Weak Label.

Tang, Z. and MacLennan, J. (2005). Data Mining with SQL Server 2005. Wiley.

Teh, Y., M. Jordan, M. Beal, and Blei, D., Hierarchical Dirichlet processes. Journal of the American Statistical Association, 2006. 101[476]:1566-1581.

Teh, Y., Newman, D., and Welling, M. (2006). A collapsed variational Bayesian inference algorithm for latent Dirichlet allocation. In Neural Information Processing Systems.

Wainwright, M. and Jordan, M. (2005). A variational principle for graphical models. In New Directions in Statistical Signal Processing, chapter 11. MIT Press.

Wang, C., and Blei, D., Decoupling sparsity and smoothness in the discrete hierarchical Dirichlet process. Neural Information Processing Systems, 2009.

Wang, C., and Blei, D., Variational inference for the nested Chinese restaurant process. Neural Information Processing Systems, 2009.

Wang, C., B. Thiesson, C. Meek, and Blei, D., Markov topic models. Artificial Intelligence and Statistics, 2009.

Wang, C., Blei, D., and D. Heckerman. Continuous time dynamic topic models. In Uncertainty in Artificial Intelligence WAIL 2008.

Wang, C., Blei, D., and L. Fei-Fei. Simultaneous image classification and annotation. Computer Vision and Pattern Recognition, 2009.

Wei, X. and Croft, B. (2006). LDA-based document models for ad-hoc retrieval. In SIGIR.

West, M. and Harrison, J. (1997). Bayesian Forecasting and Dynamic Models. Springer.

Williamson, S., C. Wang, K. Heller, and Blei, D., The IBP compound Dirichlet process and its application to focused topic modeling. International Conference on Machine Learning, 2010.

Winn, J. and Bishop, C. (2005). Variational message passing. Journal of Machine Learning Research, 6:661-694.

Witten, I. H., and Frank, E. 2005. Data Mining: Practical Machine Learning Tools and Techniques. Morgan Kaufmann.

Wu, Hao, Jiajun Bu, Chun Chen, Can Wang, Guang Qiu, Lijun Zhang, Jianfeng Shen: Modeling Dynamic Multi-Topic Discussions in Online Forums. www.cs.binghamton.edu/~zguo/icdm09.

Xing, E., Jordan, M., and Russell, S. (2003). A generalized mean field algorithm for variational inference in exponential families In Proceedings of the 19th Conference on Uncertainty in Artificial Intelligence.

Xu, Tianbing, Zhongfei Zhang, Philip S. Yu, and Bo Long, Dirichlet Process Based Evolutionary Clustering, Proc. IEEE International Conference on Data Mining, Pisa, Italy, December, 2008

Xu, Tianbing, Zhongfei Zhang, Philip S. Yu, and Bo Long, Evolutionary Clustering by Hierarchical Dirichlet Process with Hidden Markov State, Proc. IEEE International Conference on Data Mining, Pisa, Italy, December, 2008

Xu, W.; Liu, X.; and Gong, Y. 2003. Document clustering based on non-negative matrix factorization. In SIGIR, 267-273.

Xue, Xiao-Bing, Zhi-Hua Zhou, and Zhang, Zhongfei (Mark), Improve Web Search Using Image Snippets, Proc. the 21st National Conference on Artificial Intelligence, AAAI Press, Boston, Mass., USA, July, 2006

Xue, Xiao-Bing, Zhi-Hua Zhou, and Zhang, Zhongfei (Mark), Improving Web Search Using Image Snippets, ACM Transactions on Internet Technology, ACM Press, in press, 2008

Yao, Jian, and Zhang, Zhongfei (Mark), Hierarchical Shadow Detection for Color Aerial Images, Computer Vision and Image Understanding, Elsevier Science, Volume 102, Issue 1, April, 2006, pp 60-69

Yao, Jian, and Zhang, Zhongfei (Mark), Object Detection in Aerial Imagery Based on Enhanced Semi-Supervised Learning, Proc. IEEE International Conference on Computer Vision, IEEE Computer Society Press, Beijing, China, October, 2005

Yao, Jian, and Zhang, Zhongfei (Mark), Semi-Supervised Learning Based Object Detection in Aerial Imagery, proceedings of the 2005 IEEE International Conference on Computer Vision and Pattern Recognition (CVPR), San Diego, Calif., June, 2005.

Yao, Jian, and Zhang, Zhongfei (Mark), Systematic Static Shadow Detection, proceedings of the 17th International Conference on Pattern Recognition (ICPR), Cambridge, UK, August, 2004.

Yao, Jian, Sameer Antani, Rodney Long, and George Thoma, and Zhang, Zhongfei (Mark), Automatic Medical Image Annotation and Retrieval Using SECC, Proc. IEEE International Symposium on Computer Based Medical Systems, IEEE Computer Society Press, Salt Lake City, Utah, USA, June, 2006

Yao, Jian, Zhang, Zhongfei (Mark), Sameer Antani, Rodney Long, and George Thoma, Automatic Medical Image Annotation and Retrieval, Neurocomputing, Elsevier Science Press, Volume 71/10-12, 2008, pp 2012-2022

Yao, Jian, Zhang, Zhongfei (Mark), Sameer Antani, Rodney Long, and George Thoma, Automatic Medical Image Annotation and Retrieval Using SEMI-SECC, Proc. IEEE International Conference on Multimedia and Expo, IEEE Computer Society Press, Toronto, Canada, July, 2006

Yuan, Zejian, Nanning Zheng, Yuanlin Zhang and Guo, Zhen, A Design Method for Nonlinear Diffusion Filter and Its Application, The Chinese Journal of Computers, vol. 10, 2002

Zhang, Changqing, Weiyi Meng, Zhongfei Zhang, Zonghuan Wu, WebSSQL—A Query Language for Multimedia Web Documents, accepted in Proceedings of Advanced Digital Libraries, Washington, D.C., May, 2000

Zhang, Heng, Mingsheng Ying: Decidable Fragments of First-Order Language Under Stable Model Semantics and Circumscription.

Zhang, Ruofei, and Zhang, Zhongfei (Mark), A Clustering Based Approach to Efficient Image Retrieval, Proc. IEEE International Conference on Tools with Artificial Intelligence, IEEE Computer Society Press, Washington D.C., USA, November, 2002

Zhang, Ruofei, and Zhang, Zhongfei (Mark), Effective Image Retrieval Based on Hidden Concept Discovery in Image Database, IEEE Transaction on Image Processing, Volume 16, Number 2, February, 2007, pp 562-572

Zhang, Ruofei, and Zhang, Zhongfei (Mark), Empirical Bayesian Learning in the Relevance Feedback of Image Retrieval, Image and Vision Computing, Elsevier Science, Volume 24, Issue 3, March, 2006, pp 211-223

Zhang, Ruofei, and Zhang, Zhongfei (Mark), FAST: Towards More Effective and Efficient Image Retrieval, Accepted to appear in ACM Transactions on Multimedia Systems, the special issue on Multimedia Information Retrieval, Springer, 2005

Zhang, Ruofei, and Zhang, Zhongfei (Mark), Image Database Classification based on Concept Vector Model, proceedings of the 2005 IEEE International Conference on Multimedia and Expo (ICME), Amsterdam, The Netherlands, July, 2005.

Zhang, Ruofei, and Zhang, Zhongfei (Mark), Solving Small and Asymmetric Sampling Problem in the Context of Image Retrieval, in Artificial Intelligence for Maximizing Content Based Image Retrieval, Edited by Zongmin Ma, Idea Group Inc., 2008

Zhang, Ruofei, and Zhongfei (Mark) Zhang, Towards an Efficient and Effective Image Retrieval Engine (to appear), ACM Multimedia Systems Journal, accepted January 2005.

Zhang, Ruofei, and Zhongfei(Mark) Zhang, A Robust Color Object Analysis Approach to Efficient Image Retrieval, EURASIP Journal on Applied Signal Processing, Vol. 2004, No. 6, 2004.

Zhang, Ruofei, and Zhongfei(Mark) Zhang, Addressing CBIR Efficiency, Effectiveness, and Retrieval Subjectivity Simultaneously, proceedings of the 5th ACM SIGMM Int'l Workshop on Multimedia Information Retrieval (MIR), in conjunction with ACM Multimedia (ACM MM) 2003, Berkeley, Calif., November, 2003 (Oral presentation)

Zhang, Ruofei, and Zhongfei(Mark) Zhang, Hidden Semantic Concepts Discovery in Region Based Image Retrieval, proceedings of the 2004 IEEE International Conference on Computer Vision and Pattern Recognition (CVPR), Washington, D.C., June, 2004.

Zhang, Ruofei, and Zhongfei(Mark) Zhang, Stretching Bayesian Learning in the Relevance Feedback of Image Retrieval, proceedings of the 8th European Conference on Computer Vision (ECCV), Prague, Czech Republic, May, 2004

Zhang, Ruofei, Ramesh Sarukkai, Jyh-Herny Chow, Wei Dai, Zhang, Zhongfei (Mark), Joint Categorization of Queries and Clips for Web-based Video Search, Proc. International Workshop on Multimedia Information Retrieval, ACM Press, Santa Barbara, Calif., USA, November, 2006

Zhang, Ruofei, Sandeep Khanzode, and Zhang, Zhongfei (Mark), Region Based Alpha-Semantics Graph Driven Image Retrieval, proceedings of the 17th International Conference on Pattern Recognition (ICPR), Cambridge, UK, August, 2004. (Oral presentation)

Zhang, Ruofei, Zhang, Zhongfei (Mark), and Sandeep Khanzode, A Data Mining Approach to Modeling Relationships Among Categories in Image Collection, proceedings of the 10th ACM International Conference on Knowledge Discovery and Data Mining (ACM KDD), Seattle, Wash., August 2004.

Zhang, Ruofei, Zhang, Zhongfei (Mark), Mingjing Li, Wei-Ying Ma, and Hong-Jiang Zhang, A Probabilistic Semantic Model for Image Annotation and Multi-Modal Image Retrieval, ACM Multimedia Systems Journal, the special issue of Using Machine Learning Approaches to Multimedia Information Retrieval, Springer, August, 2006, Volume 12, No. 1, pp 27-33

Zhang, Ruofei, Zhang, Zhongfei (Mark), Mingjing Li, Wei-Ying Ma, and Hong-Jiang Zhang, A Probabilistic Semantic Model for Image Annotation and Multi-Modal Image Retrieval, proceedings of the 2005 IEEE International Conference on Computer Vision (ICCV'05), Beijing, China, October, 2005.

Zhang, Ruofei, Zhongfei(Mark) Zhang and Zhongyuan Qin, Semantic Repository Modeling in Image Database, proceedings of the 2004 IEEE International Conference on Multimedia and Expo (ICME), Taipei, Taiwan, June, 2004.

Zhang, Zhongfei (Mark), Andrzej Krol, Guangbiao Pu, IBMAS: An Internet-Based Medical Archive System, Proc. The 14th IEEE Symposium on Computer-Based Medical Systems, IEEE Computer Society Press, Bethesda, Md., USA, July, 2001, pp 541-546

Zhang, Zhongfei (Mark), Bo Long, Guo, Zhen, Tianbing Xu, and Philip S. Yu, Machine Learning Approaches to Link-Based Clustering, in Link Mining: Models, Algorithms and Applications, Edited by Philip S. Yu, Christos Faloutsos, and Jiawei Han, Springer, 2009

Guo, Zhen, Zhang, Zhongfei (Mark), Eric P. Xing, and Christos Faloutsos, A Max Margin Framework on Image Annotation and Multimodal Image Retrieval, in Multimedia, Edited by Vedran Kordic, IN-TECH, 2009

Zhang, Zhongfei (Mark), Florent Masseglia, Ramesh Jain, and Alberto Del Bimbo, Editorial: Introduction to the Special Issue on Multimedia Data Mining, IEEE Transactions on Multimedia, IEEE Computer Society Press, Volume 10, Number 2, 2008, pp 165-166

Zhang, Zhongfei (Mark), Florent Masseglia, Ramesh Jain, and Alberto Del Bimbo, KDD/MDM 2006: The 7th KDD Multimedia Data Mining Workshop Report, ACM KDD Explorations, ACM Publishers, Volume 8, Issue 2, December, 2006, pp 92-95

Zhang, Zhongfei (Mark), Haroon Khan, and Mark A. Robertson, A Holistic, In-Compression Approach to Video Segmentation for Independent Motion Detection, EURASIP Journal on Advances in Signal Processing, Hindawi Publishing Co., Article ID 738158, 9 pages, doi:10.1155/2008/738158, Volume 2008, 2008

Zhang, Zhongfei (Mark), John J. Salerno, Philip S. Yu, Jingzhou Hua, Zhang, Ruofei, Maureen Regan, and Debra Cutler, Applying data mining in investigating money laundering crimes, ACM KDD 2003, Washington D.C., August, 2003

Zhang, Zhongfei (Mark), Mining Surveillance Video for Independent Motion Detection, Proc. IEEE International Conf. Data Mining, IEEE Computer Society Press, Maebashi City, Japan, December, 2002

Zhang, Zhongfei (Mark), Yao, Jian, Saeed Bajwa, and Thomas Gudas, Automatic multimodal medical image fusion, IEEE Int'l Symposium on Computer Based Medical Systems, New York City, May, 2003

Zhang, Zhongfei (Mark), and Rohini K. Srihari, Subspace Morphing Theory for Appearance Based Object Identification, Pattern Recognition, Elseview Science Press, Vol. 35, No. 11, November 2002, pp 2389-2396

Zhang, Zhongfei (Mark), and Zhang, Ruofei, Multimedia Data Mining—A Systematic Introduction to Concepts and Theory, Taylor & Francis Group/CRC Press, 2008, ISBN: 9781584889663

Zhang, Zhongfei (Mark), and Zhang, Ruofei, Multimedia Data Mining, in Data Mining and Knowledge Discovery Handbook, 2nd Ed., Edited by Oded Maimon and Lior Rokach, Springer, 2009

Zhang, Zhongfei (Mark), Guo, Zhen, Christos Faloutsos, Eric P. Xing, and Jia-Yu Pan, On the scalability and adaptability for multimodal image retrieval and image annotation, in Machine Learning Techniques for Adaptive Multimedia Retrieval: Technologies Applications and Perspectives, Edited by Roger Wei, Idea Group Inc., 2010

Zhang, Zhongfei (Mark), Guo, Zhen, Christos Faloutsos, Eric P. Xing, and Jia-Yu (Tim) Pan, On the Scalability and Adaptability for Multimodal Retrieval and Annotation, International Conference on Image Analysis and Processing, Modena, Palazzo Ducale, Italy, 2007

Zhang, Zhongfei (Mark), Paul Knudson, Ruth Weinstock, Suzanne Meyer, A Web-Based Multimedia Diabetes Mellitus Education Tool for School Nurses, Proc. The 14th IEEE Symposium on Computer-Based Medical Systems, IEEE Computer Society Press, Bethesda, Md., USA, July, 2001, pp 146-151

Zhang, Zhongfei (Mark), Querying Non-Uniform Image Databases for Biometrics-Related Identification Applications, Sensor Review, Emerald Publishers, Volume 26, Number 2, April, 2006, pp 122-126

Zhang, Zhongfei (Mark), Rohini K. Srihari, and Aibing Rao, Applications of Image Understanding in Semantics-Oriented Multimedia Information Retrieval, Proc. IEEE Symposium on Multimedia Software Engineering, IEEE Computer Society Press, Taipei, Taiwan, December, 2000, pp 93-96 [ps]

Zhang, Zhongfei (Mark), Zhang, Ruofei, Yao, Jian, Guangbiao Pu, Paul E. Knudson, Ruth S. Weinstock, and Andrzej Krol, Medical Data on Demand with WebMIA, IEEE Engineering in Medicine and Biology Magazine, IEEE Press, Vol. 24, Number 3, May/June 2005, pp 117-122

Zhang, Zhongfei, and Allen Hanson, 3D Reconstruction Based on Homography Mapping, Proc. Image Understanding Workshop, Morgan Kaufmann Publishers, Inc., February, 1996, pp 1007-1012

Zhang, Zhongfei, and Allen Hanson, Scaled Euclidean 3D Reconstruction Based on Externally Uncalibrated Cameras, Proc. IEEE International Symposium on Computer Vision, IEEE Computer Society Press, November, 1995, pp 37-42

Zhang, Zhongfei, and Rohini K. Srihari, Qualitative Building Detection from Monocular Images Based on Linguistic Context, Proc. IAPR International Conference on Vision Interface, Canadian Image Processing and Pattern Recognition Society Press, Vancouver, Canada, June, 1998, pp 1-8

Zhang, Zhongfei, Automatic Segmentation and Retrieval of Video Sequences with Independently Moving Objects, Proc. of IASTED International Conference on Computer Graphics and Imaging, IASTED Press, Halifax, Canada, June, 1998, pp 94-97

Zhang, Zhongfei, Guo, Zhen, and Zhang, Ruofei, Towards Developing a Unified Multimodal Image Retrieval Framework, Proc. First IEEE International Workshop on Media Information Analysis for Personal and Social Applications, New York, N.Y., USA, July, 2009

Zhang, Zhongfei, Guo, Zhen, Christos Faloutsos, Eric P. Xing, and Jia-Yu (Tim) Pan, On the scalability and adaptability for multimodal image retrieval and image annotation, Proc. International Workshop on Visual and Multimedia Digital Libraries, Modena, Palazzo Ducale, Italy, September, 2007

Zhang, Zhongfei, Guo, Zhen, Zhang, Ruofei, Towards Developing a Unified Multimodal Image Retrieval Framework, IEEE International Workshop on Media Information Analysis for Personal and Social Applications, New York City, N.Y., 2009

Zhang, Zhongfei, Identifying Human Faces in General Appearances, Proc. of IEEE International Conference on Systems, Man, and Cybernetics, IEEE Press, San Diego, Calif., USA, October, 1998, pp 4318-4323

Zhang, Zhongfei, Qualitative Independent Motion Detection, Proc. of International Conference on Imaging Science, Systems, and Technology, CSREA Press, Las Vegas, Nev., USA, July, 1998, pp 108-111

Zhang, Zhongfei, Recognizing Human Faces in Complex Context, Proc. of International Conference on Imaging Science, Systems, and Technology, CSREA Press, Las Vegas, Nev., USA, July, 1998, pp 218-225

Zhang, Zhongfei, Renjie Jing and Weikang Gu, A New Fourier Descriptor Based on Areas [AHD] and its Applications in Object Recognition, Proc. of IEEE International Conference on Systems, Man, and Cybernetics, International Academic Publishers, August, 1988, pp 502-505

Zhang, Zhongfei, Rich Weiss, and Allen Hanson, Automatic Calibration and Visual Servoing for a Robot Navigation System, Proc. of IEEE International Conference on Robotics and Automation (ICRA) 1993, May, 1993, pp 14-19

Zhang, Zhongfei, Rich Weiss, and Allen Hanson, Obstacle Detection Based on Qualitative and Quantitative 3D Reconstruction, IEEE Transaction on Pattern Analysis and Machine Intelligence, Volume 19, No. 1, January 1997, pp 15-26.

Zhang, Zhongfei, Rich Weiss, and Allen Hanson, Obstacle Detection Based on Partial 3D Reconstruction, Proc. of Image Understanding Workshop, Morgan Kaufmann Publishers, Inc., 1994, pp 1077-1082

Zhang, Zhongfei, Rich Weiss, and Allen Hanson, Qualitative Obstacle Detection, Proc. of IEEE International Conference on Computer Vision and Pattern Recognition (CVPR), IEEE Computer Society Press, June, 1994, pp 554-559

Zhang, Zhongfei, Rich Weiss, and Edward Riseman, Feature Matching in 360 Degree Waveform for Robot Navigation, Proc. of IEEE International Conference on Computer Vision and Pattern Recognition, Maui, Hi., IEEE Computer Society Press, June, 1991, pp 742-743

Zhang, Zhongfei, Richard Weiss, and Allen Hanson, Visual Servoing Control of Autonomous Robot Calibration and Navigation, Journal of Robotic Systems, John Wiley & Sons, Volume 16, Number 6, June, 1999, pp 313-328

Zhang, Zhongfei, Rohini K. Srihari, and Aibing Rao, Face Detection and Its Applications in Intelligent and Focused Image Retrieval, Proc. IEEE Computer Society Eleventh Conference on Tools with Artificial Intelligence, IEEE Computer Society Press, Chicago, Ill., Nov. 9-11, 1999, pp 121-128

Zhang, Zhongfei, Zhang, Ruofei, Multimedia data mining: a systematic introduction to concepts and theory, CRC Press (2009).

Zhang, Zhongfei, and Rohini K. Srihari, Subspace Morphing Theory for Appearance Based Object Identification, Proc. International Conference on Advances in Infrastructure for Electronic Business, Science, and Education on the Internet, Scuola Superiore G. Reiss Romoli Press, CDROM Edition, L'Aquila, Italy, August, 2000

Zhang, Zhongfei, and Rohini Srihari, Knowledge Supervised Perceptual Grouping Based qualitative building detection from monocular aerial images, Int'l Journal on Artificial Intelligence Tools, 12(1), 2003.

Zhang, Zhongfei, and Haroon Khan, A Holistic, In-Compression Approach to Mining Independent Motion Segments for Massive Surveillance Video Collections, in Video Search and Mining, Edited by Dan Schonfeld, Caifeng Shan, Dacheng Tao, and Liang Wan, Springer, 2009

Zhu, S., K. Yu, Y. Chi, and Y. Gong, "Combining content and link for classification using matrix factorization," in SIGIR, 2007, pp. 487-494.

The invention claimed is:

1. A method for characterizing a corpus of documents each having one or more references, comprising:
   identifying a network of multilevel hierarchically related documents having direct references, and indirect references, wherein the references are associated with content relationships;
   for each respective document, determining a first set of latent topic characteristics based on an intrinsic content of the respective document;
   for each document, determining a second set of latent topic characteristics based on a respective content of other documents which are referenced directly and indirectly through at least one other document to the respective document, the indirectly referenced documents contributing transitively to the latent topic characteristics of the respective document;

representing a set of latent topics for the respective document based on a joint probability distribution of at least the first and second sets of latent topic characteristics, dependent on the identified network, wherein the contributions of at least the second set of latent topic characteristics are determined by an iterative process, wherein the represented set of latent topics is modeled at both a document level and a reference level, by differentiating the two different levels and the multilevel hierarchical network which is captured by a Bernoulli random process; and storing, in a memory, the represented set of latent topics for the respective document.

2. The method according to claim 1, wherein the network comprises a Bayesian network structure.

3. The method according to claim 1, wherein relationships among the documents are modeled by a Bernoulli process such that a topic distribution of each respective document is a mixture of distributions associated with the related documents.

4. The method according to claim 1, wherein the corpus of documents is modeled by a generative probabilistic model of a topic content of a corpus along with the references among the documents.

5. The method according to claim 1, wherein the iterative process at a reference level comprises iterating, for each document $d_j$, for the i-th location in document $d_j$, choosing a topic $z_{ji}$ from the topic distribution of document $d_j$, $p(z|d_j,\theta_{d_j})$, where the distribution parameter $\theta_{d_j}$ is drawn from a Dirichlet distribution $Dir(\alpha)$, choosing a word $w_{ji}$ which follows the multinomial distribution $p(w|z_{ji},\Lambda)$ conditioned on the topic $z_{ji}$, and incrementing the locations and documents.

6. The method according to claim 5, wherein the iterative process at a document level comprises iterating, for each document $d_s$, for the i-th location in document $d_s$, choosing a referenced document $c_{si}$ from $p(c|d_s,\Xi)$, a multinomial distribution conditioned on the document $d_s$, choosing a topic $t_{si}$ from the topic distribution of the document $c_{si}$ at the reference level, and choosing a word $w_{si}$ which follows the multinomial distribution $p(w|t_{si},\Lambda)$ conditioned on the topic $t_{si}$, where $\Xi$ is a mixing coefficient matrix which represents how much of the content of the respective document is from direct or indirect references, and a composition of $\Xi$ and $\theta$ models the topic distribution at the document level, and incrementing the locations and documents.

7. The method according to claim 6, wherein a number of latent topics is K and the mixing coefficients are parameterized by an N×N matrix $\Xi$ where $\Xi_{js}=p(c_{si}=d_j|d_s)$, which are treated as a fixed quantity computed from the reference information of the corpus.

8. The method according to claim 7, wherein topic distributions at the reference level are parameterized by a K×N matrix $\Theta$ where $\Theta=p(z_{ji}=1|d_j)$, which is to be estimated, and an M×K word probability matrix $\Lambda$, where $\Lambda_{hl}=p(w_{si}^h=1|t_{si}=1)$, which is to be estimated.

9. The method according to claim 8, wherein the references comprise citations, each document $d_s$ having a set of citations $Q_{d_s}$, further comprising constructing a matrix S to denote direct relationships among the documents wherein $$S_{ls} = \frac{1}{|Q_{d_s}|} \text{ for } d_l \in Q_{d_s} \text{ and } 0 \text{ otherwise,}$$

where $|Q_{d_s}|$ denotes the size of the set $Q_{d_s}$, and employing a generative process for generating a related document c from the respective document $d_s$, comprising:

setting l=s;

choosing t~Bernoulli($\beta$);

if t=1, choosing h~Multinomial($S_{\cdot l}$), where $S_{\cdot l}$ denotes the l-th column; setting l=h, and returning to said choosing step; and if t=0, letting $c=d_l$, to thereby combine a Bernoulli process and a random walk on a directed graph together, where a transitive property of the citations is captured, wherein the parameter $\beta$ of the Bernoulli process determines a probability that the random walk stops at a current node, and the parameter $\beta$ also specifies how much of the content of the respective document is influenced from the direct or indirect citations.

10. The method according to claim 1, wherein a generative process for the corpus leads to a joint probability distribution $$p(c, z, D, \Theta \mid \alpha, \Lambda) \mid z_{si}, \Lambda) =$$

$$p(\Theta \mid \alpha) \prod_{s=1}^{N} p(c_s \mid d_s) p(z_s \mid c_s) \prod_{i=1}^{L_s} p(w_{si} \mid z_{si}, \Lambda)$$

where $p(\Theta \mid \alpha) = \prod_{j=1}^{N} p(\theta_j \mid \alpha)$, $p(c_s \mid d_s) = \prod_{i=1}^{L_s} p(c_{si} \mid d_s)$, and $p(z_s \mid c_s) = \prod_{i=1}^{L_s} p(z_{si} \mid c_{si}, \theta_{c_{si}})$, and a marginal distribution of the corpus obtained by integrating over $\Theta$ and summing over c, z $$p(D) = \int \sum_z \sum_c p(c, z, D, \Theta \mid \alpha, \Lambda) d\Theta$$

$$= B(\alpha)^{-N} \int \left( \prod_{j=1}^{N} \prod_{i=1}^{K} \Theta_{ij}^{\alpha_i-1} \right) \prod_{s=1}^{N} \prod_{i=1}^{L_s} \sum_{l=1}^{K} \sum_{t=1}^{N} \prod_{h=1}^{M} (\Xi_{ts} \Theta_{lt} \Lambda_{hl})^{w_{si}^h} d\Theta$$

where $B(\alpha) = \prod_{i=1}^{K} \Gamma(\alpha_i) \Big/ \Gamma\left(\sum_{i=1}^{K} \alpha_i\right)$.

11. The method according to claim 1, wherein a generative process for the corpus leads to a joint distribution of c, z, $\theta$ represented as:

$\alpha \rightarrow \theta \rightarrow z \rightarrow w_{|c}$ $d \rightarrow c \rightarrow t \rightarrow w_{|d|}$ $\theta \rightarrow t$ $\Xi \rightarrow c$ $w_{|c|} \leftarrow \Lambda \rightarrow w_{|z|}$ and update rules for the iterative process comprise:

$$\Phi_{sjhl} \propto \Xi_{js}\Lambda_{hl} \exp\left(\Psi(\gamma_{jl}) - \Psi\left(\sum_{t=1}^{K} \gamma_{jt}\right)\right) \quad (2)$$

$$\gamma_{sl} = \alpha_l + \sum_{g=1}^{N} \sum_{h=1}^{M} A_{hg}\Phi_{gshl} \quad (3)$$

$$\Lambda_{hl} \propto \sum_{s=1}^{N} \sum_{j=1}^{N} A_{hs}\Phi_{sjhl} \quad (4)$$

where $A_{hs} = \sum_{i=1}^{L_s} w_{si}^h$ and $\Psi(\bullet)$ is digamma function.

12. The method according to claim 11, wherein the iterative update rules $$\Phi_{sjhl} \propto \Xi_{js}\Lambda_{hl} \exp\left(\Psi(\gamma_{jl}) - \Psi\left(\sum_{t=1}^{K} \gamma_{jt}\right)\right) \quad (2)$$

$$\gamma_{sl} = \alpha_l + \sum_{g=1}^{N} \sum_{h=1}^{M} A_{hg}\Phi_{gshl} \quad (3)$$

$$\Lambda_{hl} \propto \sum_{s=1}^{N} \sum_{j=1}^{N} A_{hs}\Phi_{sjhl} \quad (4)$$

are performed in order until convergence.

13. The method according to claim 11, wherein the iterative update rules $$\Phi_{sjhl} \propto \Xi_{js}\Lambda_{hl} \exp\left(\Psi(\gamma_{jl}) - \Psi\left(\sum_{t=1}^{K} \gamma_{jt}\right)\right) \quad (2)$$

$$\gamma_{sl} = \alpha_l + \sum_{g=1}^{N} \sum_{h=1}^{M} A_{hg}\Phi_{gshl} \quad (3)$$

are performed in order until convergence to learn the topic distribution of new corpus.

14. A method for characterizing a corpus of documents each having one or more citation linkages, comprising:
identifying a multilevel hierarchy of linked documents having direct references, and indirect references, wherein the citation linkages have semantic significance;
for each respective document, determining latent topic characteristics based on an intrinsic semantic content of the respective document, semantic content associated with directly cited documents, and semantic content associated with documents referenced by directly cited documents, wherein a semantic content significance of a citation has a transitive property;
representing latent topics for documents within the corpus based on a joint probability distribution of the latent topic characteristics, wherein the latent topics are modeled at both a document level and a citation level, and distinctions in the multilevel hierarchical network are captured by a Bernoulli random process; and
storing, in a memory, the represented set of latent topics.

15. The method according to claim 14, wherein relationships among the corpus of documents are modeled by a Bernoulli process such that a topic distribution of each respective document is a mixture of distributions associated with the linked documents.

16. The method according to claim 14, wherein the corpus of documents is modeled by a generative probabilistic model of a topic content of each document of the corpus of documents along with the linkages among members of the corpus of documents.

17. The method according to claim 14, wherein the joint probability distribution is estimated by an iterative process at a citation level, comprising, for each document $d_j$, and for the i-th location in document $d_j$, choosing a topic $z_{ji}$ from the topic distribution of document $d_j$, $p(z|d_j,\theta_{d_j})$, where the distribution parameter $\theta_{d_j}$ is drawn from a Dirichlet distribution $Dir(\alpha)$, choosing a word $w_{ji}$ which follows the multinomial distribution $p(w|z_{ji},\Lambda)$ conditioned on the topic $z_{ji}$, and respectively incrementing the locations and documents.

18. The method according to claim 17, wherein the joint probability distribution is estimated by an iterative process at a document level comprising, for each document $d_s$, and for the i-th location in document $d_s$, choosing a cited document $c_{si}$ from $p(c|d_s,\Xi)$, a multinomial distribution conditioned on the document $d_s$, choosing a topic $t_{si}$ from the topic distribution of the document $c_{si}$ at the citation level, and choosing a word $w_{si}$ which follows the multinomial distribution $p(w|t_{si},\Lambda)$ conditioned on the topic $t_{si}$, where $\Xi$ is a mixing coefficient matrix which represents how much of the content of the respective document is from direct or indirect references, and a composition of $\Xi$ and $\theta$ models the topic distribution at the document level, and respectively incrementing the locations and documents.

19. The method according to claim 18, wherein a number of latent topics is K and the mixing coefficients are parameterized by an N×N matrix $\Xi$ where $\Xi_{js}=p(c_{si}=d_j|d_s)$, which are treated as a fixed quantity computed from the citation information of the corpus of documents,
wherein topic distributions at the citation level are parameterized by a K×N matrix $\Theta$ where $\Theta_{lj}=p(z_{ji}=l|d_j)$, which is to be estimated, and an M×K word probability matrix $\Lambda$, where $\Lambda_{hl}=p(w_{si}^h=1|t_{si}=l)$, which is to be estimated,
wherein each document $d_s$ has a set of citations $Q_{d_s}$, further comprising constructing a matrix S to denote direct relationships among the documents wherein $$S_{ls} = \frac{1}{|Q_{d_s}|} \text{ for } d_l \in Q_{d_s} \text{ and } 0 \text{ otherwise,}$$

where $|Q_{d_s}|$ denotes the size of the set $Q_{d_s}$, and employing a generative process for generating a related document c from the respective document $d_s$, comprising:
setting l=s;
choosing t~Bernoulli($\beta$);
if t=1, choosing h~Multinomial($S_{\cdot,l}$), where $S_{\cdot,l}$ denotes the l-th column; setting l=h, and returning to said choosing step; and
if t=0, letting c=$d_l$,
to thereby combine a Bernoulli process and a random walk on a directed graph together, where a transitive property of the citations is captured, wherein the parameter $\beta$ of the Bernoulli process determines a probability that the random walk stops at a current node, and the parameter $\beta$ also specifies how much of the content of the respective document is influenced from the direct or indirect citations.

20. The method according to claim 17, wherein generative processes for the corpus lead to a joint probability distribution $$p(c, z, D, \Theta \mid \alpha, \Lambda) \mid z_{si}, \Lambda) =$$

$$p(\Theta \mid \alpha) \prod_{s=1}^{N} p(c_s \mid d_s) p(z_s \mid c_s) \prod_{i=1}^{L_s} p(w_{si} \mid z_{si}, \Lambda)$$

where $p(\Theta \mid \alpha) = \prod_{j=1}^{N} p(\theta_j \mid \alpha)$, $p(c_s \mid d_s) = \prod_{i=1}^{L_s} p(c_{si} \mid d_s)$, and $p(z_s \mid c_s) = \prod_{i=1}^{L_s} p(z_{si} \mid c_{si}, \theta_{c_{si}})$, and a marginal distribution of the corpus obtained by integrating over $\Theta$ and summing over c, z $$p(D) = \int \sum_z \sum_c p(c, z, D, \Theta \mid \alpha, \Lambda) d\Theta$$

$$= B(\alpha)^{-N} \int \left( \prod_{j=1}^{N} \prod_{i=1}^{K} \Theta_{ij}^{\alpha_i - 1} \right) \prod_{s=1}^{N} \prod_{i=1}^{L_s} \sum_{t=1}^{K} \sum_{t=1}^{N} \prod_{h=1}^{M} (\Xi_{ts} \Theta_{lt} \Lambda_{hl})^{w_{si}^h} d\Theta$$

where $B(\alpha) = \prod_{i=1}^{K} \Gamma(\alpha_i) \Big/ \Gamma\left(\sum_{i=1}^{K} \alpha_i\right)$.

21. The method according to claim 20, a joint distribution of c, z, θ of a generative process for the corpus is represented as:

$\beta \to \theta \to z \to w_{|c|}$;
$d \to c \to t \to w_{|d|}$
$\theta \to t$
$\Xi \to c$
$w_{|c|} \leftarrow \Lambda \to w_{|z|}$ and iterative update rules for the iterative process comprise:

$$\Phi_{sjhl} \propto \Xi_{js} \Lambda_{hl} \exp\left( \Psi(\gamma_{jl}) - \Psi\left( \sum_{t=1}^{K} \gamma_{jt} \right) \right) \quad (2)$$

$$\gamma_{sl} = \alpha_l + \sum_{g=1}^{N} \sum_{h=1}^{M} A_{hg} \Phi_{gshl} \quad (3)$$

$$\Lambda_{hl} \propto \sum_{s=1}^{N} \sum_{j=1}^{N} A_{hs} \Phi_{sjhl} \quad (4)$$

where $A_{hs} = \sum_{i=1}^{L_s} w_{si}^h$ and $\Psi(\cdot)$ is a digamma function.

22. The method according to claim 21, wherein at least the iterative update rules $$\Phi_{sjhl} \propto \Xi_{js} \Lambda_{hl} \exp\left( \Psi(\gamma_{jl}) - \Psi\left( \sum_{t=1}^{K} \gamma_{jt} \right) \right) \quad (2)$$

$$\gamma_{sl} = \alpha_l + \sum_{g=1}^{N} \sum_{h=1}^{M} A_{hg} \Phi_{gshl} \quad (3)$$

are performed in sequence iteratively until convergence within a convergence criterion.

* * * * *